United States Patent
Ayai et al.

(10) Patent No.: US 9,882,508 B2
(45) Date of Patent: Jan. 30, 2018

(54) HIGH-FREQUENCY SWITCHING TYPE CONVERSION DEVICE

(71) Applicant: Sumitomo Electric Industries, Ltd., Osaka-shi (JP)

(72) Inventors: Naoki Ayai, Osaka (JP); Tetsuo Akita, Osaka (JP); Toshiaki Okumura, Osaka (JP); Kenji Abiru, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/032,197

(22) PCT Filed: Dec. 19, 2014

(86) PCT No.: PCT/JP2014/083736
§ 371 (c)(1),
(2) Date: Apr. 26, 2016

(87) PCT Pub. No.: WO2015/104979
PCT Pub. Date: Jul. 16, 2015

(65) Prior Publication Data
US 2016/0268890 A1    Sep. 15, 2016

(30) Foreign Application Priority Data

Jan. 10, 2014 (JP) .................. 2014-003623
Oct. 17, 2014 (JP) .................. 2014-212698

(51) Int. Cl.
*H02M 7/44* (2006.01)
*H02M 1/08* (2006.01)
(Continued)

(52) U.S. Cl.
CPC .............. *H02M 7/44* (2013.01); *H02M 1/08* (2013.01); *H02M 1/42* (2013.01); *H02M 3/156* (2013.01);
(Continued)

(58) Field of Classification Search
CPC .. H02M 7/537; H02M 3/156; H02M 7/53871; H02M 1/126; H02M 1/14;
(Continued)

(56) References Cited

U.S. PATENT DOCUMENTS

2006/0156096 A1   7/2006 Sato
2006/0250831 A1*  11/2006 Li ..................... H02M 7/5387
                                                  363/132
(Continued)

FOREIGN PATENT DOCUMENTS

EP      1039620 A2    9/2000
EP      1753634 B1    5/2010
(Continued)

OTHER PUBLICATIONS

Extended European Search Report in related European Patent Application No. 14811023.2, dated Jan. 31, 2017.
(Continued)

*Primary Examiner* — Gustavo Rosario Benitez
(74) *Attorney, Agent, or Firm* — Venable LLP; Michael A. Sartori; Miguel A. Lopez

(57) ABSTRACT

Provided is a conversion device that converts DC power provided from a DC power supply, to AC power and supplies the AC power to a load, the conversion device including: a filter circuit connected to the load and including an AC reactor and a first capacitor; a DC/AC inverter connected to the load via the filter circuit; a DC/DC converter provided between the DC power supply and the DC/AC inverter; a second capacitor provided between the DC/AC inverter and the DC/DC converter; and a control unit configured to set a current target value for the DC/DC converter to thereby be synchronized with current of the AC power, based on voltage of the AC power, voltage variation due to current flowing through the AC reactor and an
(Continued)

impedance thereof, reactive currents respectively flowing through the first capacitor and the second capacitor, and voltage of the DC power.

11 Claims, 22 Drawing Sheets

(51) Int. Cl.
    *H02M 1/42* (2007.01)
    *H02M 7/48* (2007.01)
    *H02M 3/156* (2006.01)
    *H02M 1/00* (2006.01)
    *H02M 3/04* (2006.01)

(52) U.S. Cl.
    CPC ............... *H02M 7/48* (2013.01); *H02M 3/04* (2013.01); *H02M 2001/007* (2013.01); *H02M 2001/0009* (2013.01)

(58) Field of Classification Search
    CPC ............ H02M 1/12; H02M 7/12; H02M 7/48; H02M 1/00; H02M 3/04; H02M 1/08; H02M 1/42; H02M 7/44; H02M 2001/0009; H02M 2001/007
    See application file for complete search history.

(56) References Cited

U.S. PATENT DOCUMENTS

| | | | | |
|---|---|---|---|---|
| 2009/0121549 | A1* | 5/2009 | Leonard | H02M 3/156 307/51 |
| 2010/0156186 | A1* | 6/2010 | Kim | H01M 16/003 307/72 |
| 2012/0134191 | A1* | 5/2012 | Yoneda | H01M 10/02 363/131 |
| 2012/0201064 | A1* | 8/2012 | Asakura | H02M 7/53871 363/98 |
| 2013/0009482 | A1* | 1/2013 | Okui | H02J 3/24 307/66 |
| 2014/0085953 | A1* | 3/2014 | Mao | H02M 7/537 363/131 |
| 2014/0104907 | A1* | 4/2014 | Shimada | H02M 7/487 363/80 |

FOREIGN PATENT DOCUMENTS

| | | |
|---|---|---|
| EP | 2693288 A1 | 2/2014 |
| EP | 3093972 A1 | 11/2016 |
| JP | 62-200413 A | 9/1987 |
| JP | 08-044446 A | 2/1996 |
| JP | 2000-152651 A | 5/2000 |
| JP | 2000-341862 A | 12/2000 |
| JP | 2002-369544 A | 12/2002 |
| JP | 2002-374681 A | 12/2002 |
| JP | 2003-009537 A | 1/2003 |
| JP | 2003-134667 A | 5/2003 |
| JP | 2003-289626 A | 10/2003 |
| JP | 2003-348768 A | 12/2003 |
| JP | 2005-204485 A | 7/2005 |
| JP | 2005-218157 A | 8/2005 |
| JP | 4195948 B2 | 12/2008 |
| JP | 4200244 B2 | 12/2008 |
| JP | 4379959 B2 | 12/2009 |
| JP | 2010-066919 A | 3/2010 |
| JP | 4468371 B2 | 5/2010 |
| JP | 4487354 B2 | 6/2010 |
| JP | 4622021 B2 | 2/2011 |
| JP | 2011-083170 A | 4/2011 |
| JP | 2012-055036 A | 3/2012 |
| JP | 5618022 B1 | 11/2014 |
| JP | 5618023 B1 | 11/2014 |
| WO | 2005/115788 A1 | 12/2005 |
| WO | 2006/033142 A1 | 3/2006 |
| WO | 2012/132948 A1 | 10/2012 |

OTHER PUBLICATIONS

Extended European Search Report in related European Patent Application No. 14811444.0, dated Feb. 7, 2017.
Patent Examination Report in Australian Patent Application No. 2014279387, dated Jan. 28, 2016.
International Search Report in PCT International Application No. PCT/JP2014/083736, dated Mar. 17, 2015.
U.S. Appl. No. 14/890,882, filed Nov. 12, 2015.
International Search Report in International Application No. PCT/JP2014/063606, dated Jul. 15, 2014.
International Search Report in International Application No. PCT/JP2014/063610, dated Jul. 15, 2014.
International Search Report in International Application No. PCT/JP2014/083731, dated Mar. 17, 2015.
Office Action in Japanese Patent Application No. 2014-104326, dated Jun. 24, 2015.
U.S. Appl. No. 14/891,292, filed Nov. 13, 2015.
Davis, "SiC Transistor Basics: FAQs" Retrieved from http://www.powerelectronics.com/print/11365, XP055408593, Oct. 9, 2013, 9 Pages. [Cited in EESR].

* cited by examiner

HIGH-FREQUENCY SWITCHING TYPE CONVERSION DEVICE

TECHNICAL FIELD

The present invention relates to a conversion device that performs conversion from DC to AC or conversion from AC to DC.

BACKGROUND ART

Conversion devices that convert DC voltage outputted from a storage battery to AC voltage and provides the AC voltage to a load are often used as a backup power supply such as a UPS (Uninterruptible Power Supply) (see, for example, Patent Literature 1 (FIG. 1)). Such a conversion device includes a DC/DC converter for stepping up voltage of the storage battery and an inverter for performing conversion from DC to AC. The conversion device is capable of bidirectional operation, and normally, converts AC voltage outputted from an AC power supply such as a commercial power supply, to DC voltage adapted for charging, and charges the storage battery. In this case, the inverter operates as an AC/DC converter, and the DC/DC converter performs step-down operation.

A conversion device (power conditioner) is used also for converting DC power obtained from a DC power supply such as photovoltaic power generation to AC power and performing system interconnection with an AC power system (see, for example, Patent Literature 2).

CITATION LIST

Patent Literature

PATENT LITERATURE 1: Japanese Laid-Open Patent Publication No. 2003-348768
PATENT LITERATURE 2: Japanese Laid-Open Patent Publication No. 2000-152651

SUMMARY OF INVENTION

Technical Problem

In the above conventional conversion device, the AC/DC converter and the DC/DC converter are both composed of switching elements, and constantly perform high-speed switching. Such switching elements are accompanied with slight switching loss. Although loss in one switching is slight, high-frequency switching of a plurality of switching elements causes switching loss that cannot be neglected as a whole. The switching loss naturally leads to power loss. On the other hand, Patent Literature 2 discloses a control method for reducing loss, but there is a problem that a loss reduction effect is not sufficiently obtained by this control method alone, and the AC waveform is distorted.

In view of the above problems, an object of the present invention is to achieve a high conversion efficiency by reducing switching loss in a conversion device, and achieve an AC waveform with small distortion.

Solution to Problem

A conversion device of the present invention is a conversion device that converts DC power provided from a DC power supply, to AC power and supplies the AC power to a load, the conversion device including: a filter circuit connected to the load and including an AC reactor and a first capacitor; a DC/AC inverter connected to the load via the filter circuit; a DC/DC converter provided between the DC power supply and the DC/AC inverter; a second capacitor provided between the DC/AC inverter and the DC/DC converter; and a control unit configured to set a current target value for the DC/DC converter to thereby be synchronized with current of the AC power, based on voltage of the AC power, voltage variation due to current flowing through the AC reactor and an impedance thereof, reactive currents respectively flowing through the first capacitor and the second capacitor, and voltage of the DC power.

Advantageous Effects of Invention

The conversion device of the present invention can achieve a high conversion efficiency and an AC waveform with small distortion at the same time.

DESCRIPTION OF EMBODIMENTS

Summary of Embodiments

Figure 1:
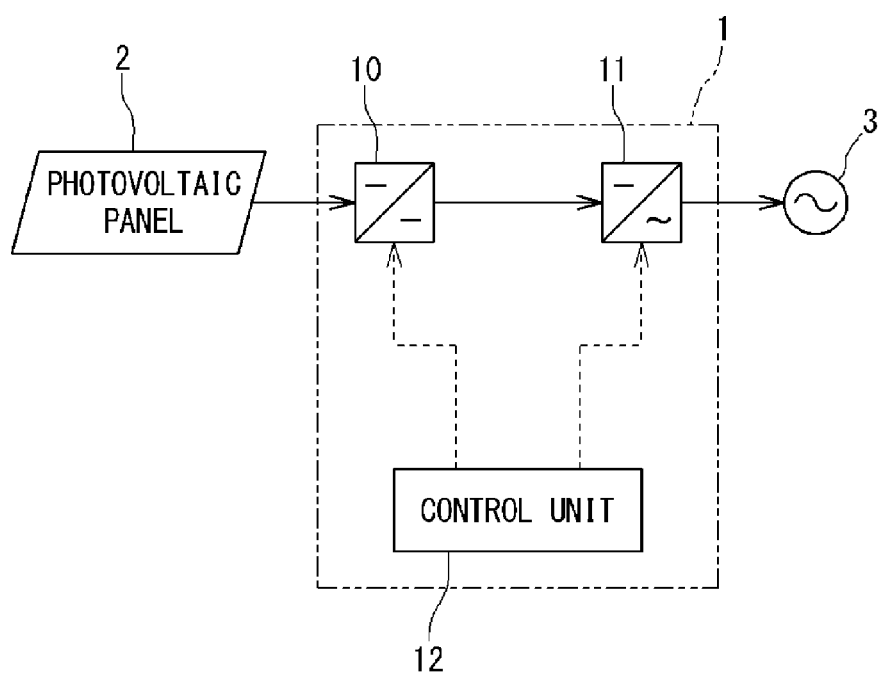
FIG. 1 is a block diagram showing an example of a system including an inverter device according to the first embodiment.

Summary of the embodiments of the present invention includes at least the following.

(1) This provides a conversion device that converts DC power provided from a DC power supply, to AC power and supplies the AC power to a load, the conversion device including: a filter circuit connected to the load and including an AC reactor and a first capacitor; a DC/AC inverter connected to the load via the filter circuit; a DC/DC converter provided between the DC power supply and the DC/AC inverter; a second capacitor provided between the DC/AC inverter and the DC/DC converter; and a control unit configured to set a current target value for the DC/DC converter to thereby be synchronized with current of the AC power, based on voltage of the AC power, voltage variation due to current flowing through the AC reactor and an impedance thereof, reactive currents respectively flowing through the first capacitor and the second capacitor, and voltage of the DC power.

In the conversion device configured as in the above (1), the DC/AC inverter and the DC/DC converter each perform high-frequency switching a minimum necessary number of times. In addition, the AC/DC converter operates in a region other than the peak of the absolute value of AC voltage and the vicinity thereof, and the DC/DC converter operates in a region other than the zero cross point of AC voltage and the vicinity thereof. Therefore, in high-frequency switching, voltages applied to the semiconductor elements of each converter and the reactor are relatively reduced. This also contributes to reduction in switching loss in the semiconductor elements and iron loss in the reactor. Thus, the entire loss in the conversion device can be reduced.

In order to achieve the "minimum necessary number of times" as described above, ideally, it is preferable that the DC/AC inverter and the DC/DC converter alternately perform high-frequency switching so that their respective periods of high-frequency switching do not overlap each other. However, in practice, even if both periods slightly overlap each other, as long as a stop period is provided for each of the DC/AC inverter and the DC/DC converter, the loss can be reduced, leading to enhancement in the efficiency.

Based on voltage of AC power, voltage variation due to current flowing through the AC reactor and the impedance thereof, reactive currents flowing through the first and second capacitors, and voltage of DC power, the current target value for the DC/DC converter is set to be synchronized with current of AC power, whereby AC power with no distortion can be constantly generated. Particularly, in a case where the load is interconnected with an AC system, current that is constantly synchronized with the system voltage (or controlled at a given phase angle relative to the system voltage) and has no distortion can flow to or from the AC system, irrespective of variation in the voltage, frequency, and output current of the AC power supply.

(2) In the conversion device of (1), preferably, in a case where an output current target value for the load is Ia*, an electrostatic capacitance of the first capacitor is Ca, a voltage value of the AC power is Va, voltage on the DC power supply side is $V_{DC}$, and an Laplace operator is s, the control unit sets an AC output current target value Iinv* for the DC/AC inverter at a circuit connection point between the filter circuit and the DC/AC inverter, as follows:

$$Iinv^* = Ia^* + sCaVa,$$

in a case where an impedance of the AC reactor is Za, the control unit sets an AC output voltage target value Vinv* for the DC/AC inverter at the circuit connection point, as follows:

$$Vinv^* = Va + ZaIinv^*,$$

the control unit sets the greater one of the voltage $V_{DC}$ and an absolute value of the AC output voltage target value Vinv* for the DC/AC inverter, as an output voltage target value Vo* for the DC/DC converter, and in a case where an electrostatic capacitance of the second capacitor is C, the control unit sets a current target value Iin* for the DC/DC converter, as follows:

$$Iin^* = \{(Iinv^* \times Vinv^*) + (sCVo^*) \times Vo^*\}/V_{DC}.$$

The conversion device of the above (2) is an example showing a more specific control manner for achieving the conversion device of (1). In the current target value Iin* for the DC/DC converter, voltage of AC power, voltage variation due to current flowing through the AC reactor and the impedance thereof, reactive currents flowing through the first and second capacitors, and voltage of DC power are all reflected. Therefore, irrespective of variation in voltage of the DC power supply or variation in the AC output current, power synchronized with the AC output current can be constantly outputted. Therefore, the DC/DC converter and the DC/AC inverter can perform conversion from AC to DC while performing high-frequency switching a minimum necessary number of times. As a result, switching loss in semiconductor switching elements and iron loss in an AC reactor and a DC reactor can be greatly reduced, and a high conversion efficiency can be achieved. Further, outputted AC power has a high quality, and current with distortion that is sufficiently small for interconnection with the commercial system can be obtained.

Instead of Laplace operator s, in a case of using a derivative with respect to time t, the above expression is represented as follows.

$$Iinv^* = Ia^* - Ca \times (dVa/dt)$$

$$Iin^* = \{(Iinv^* \times Vinv^*) + C \times (dVo^*/dt) \times Vo^*\}/V_{DC}$$

By measuring power loss $P_{LOSS}$ in the conversion device in advance, the current target value Iin* can also be represented by the following expression.

$$Iin^* = \{(Iinv^* \times Vinv^*) + C \times (dVo^*/dt) \times Vo^* + P_{LOSS}\}/V_{DC}$$

In this case, it is possible to calculate the value of Iin* more strictly by considering the power loss $P_{LOSS}$.

(3) In the conversion device of (2), the DC/DC converter may include a DC reactor, and in a case where voltage of the DC power supply is Vg, an impedance of the DC reactor is Z, and a current value of the DC/DC converter is Iin, (Vg−ZIin) may be used as the voltage $V_{DC}$.

(4) As the current value Iin of the DC/DC converter, a detection value (a current detection value of the DC reactor) of a current sensor or a calculation value obtained by Iinv*×Vinv*/Vg may be used.

In the cases of the above (3) and (4), since voltage drop due to the current and impedance of the DC reactor is also considered, it is possible to constantly perform accurate control irrespective of variation in current flowing through the DC/DC converter.

(5) In the conversion device of any one of (1) to (4), the DC/AC inverter may be controlled based on comparison between a reference value based on a target value and a detection value of AC output current of the DC/AC inverter, and an output voltage target value for the DC/DC converter, and the DC/DC converter may be controlled based on comparison between a reference value based on a current target value and a detection value of the DC/DC converter, and the output voltage target value for the DC/DC converter.

Thus, the DC/AC inverter and the DC/DC converter are controlled based on the same voltage target value, whereby the distortion rate of the AC output current can be reduced.

(6) An AC power supply may be connected in parallel to the load.

The conversion device configured as in the above (6) converts power supplied from the DC power supply, to AC power, performs parallel operation interconnected with the AC power supply such as a commercial power system, and thereby can provide the AC power supply to the load.

(7) The DC power supply may be a DC load, the load may be an AC power supply, and power may be supplied from the AC power supply to the DC load.

The conversion device configured as in the above (7) can perform conversion from AC to DC.

In conversion from AC to DC, the DC/AC inverter operates as an AC/DC converter. The DC/DC converter operates as a DC/DC converter in which current flows in a direction opposite to the direction in conversion from DC to AC. Also in conversion from AC to DC, the AC/DC converter and the DC/DC converter perform high-frequency switching a minimum necessary number of times. Therefore, switching loss in the semiconductor switching elements and iron loss in the AC reactor and the DC reactor can be greatly reduced, and a high conversion efficiency can be achieved.

In the calculation expressions in (2), if the phase of the output current target value Ia* is inverted, expressions for giving a target value in conversion from AC to DC are obtained. In this case, the current target value Iin* for the DC/DC converter is negative relative to the DC voltage Vg. Therefore, actually, the conversion devices described in (1) to (7) allow conversion from DC to AC and conversion from AC to DC by a common device.

(8) It is desirable that an SiC element is used for at least one of semiconductor switching elements included in the DC/DC converter and the DC/AC inverter.

In the conversion device described in any one of (1) to (7), switching loss in the semiconductor elements and iron loss in the DC reactor and the AC reactor can be reduced by decrease in the number of times of high-frequency switching, but conduction loss in the semiconductor elements cannot be reduced. In this regard, using SiC elements as the semiconductor elements enables reduction in the conduction loss. Therefore, if SiC elements are used for the conversion device of any one of (1) to (7), a high conversion efficiency can be achieved by the synergistic effect therebetween.

Details of Embodiments

Hereinafter, embodiments of the present invention will be described in detail with reference to the drawings.

<<DC-to-AC Conversion Device with System Interconnection Function>>

First, a DC-to-AC conversion device with a system interconnection function (hereinafter, simply referred to as an inverter device) will be described in detail.

1. First Embodiment

[1.1 Overall Configuration]

FIG. 1 is a block diagram showing an example of a system including an inverter device according to the first embodiment. In FIG. 1, a photovoltaic panel 2 as a DC power supply is connected to an input end of an inverter device 1, and an AC commercial power system 3 (AC system) is connected to an output end of the inverter device 1. This system performs interconnection operation to convert DC power generated by the photovoltaic panel 2 to AC power and output the AC power to the commercial power system 3.

The inverter device 1 includes a step-up circuit (DC/DC converter) 10 which receives DC power outputted from the photovoltaic panel 2, an inverter circuit (DC/AC inverter) 11 which converts power given from the step-up circuit 10 to AC power and outputs the AC power to the commercial power system 3, and a control unit 12 which controls operations of these circuits 10 and 11.

Figure 2:
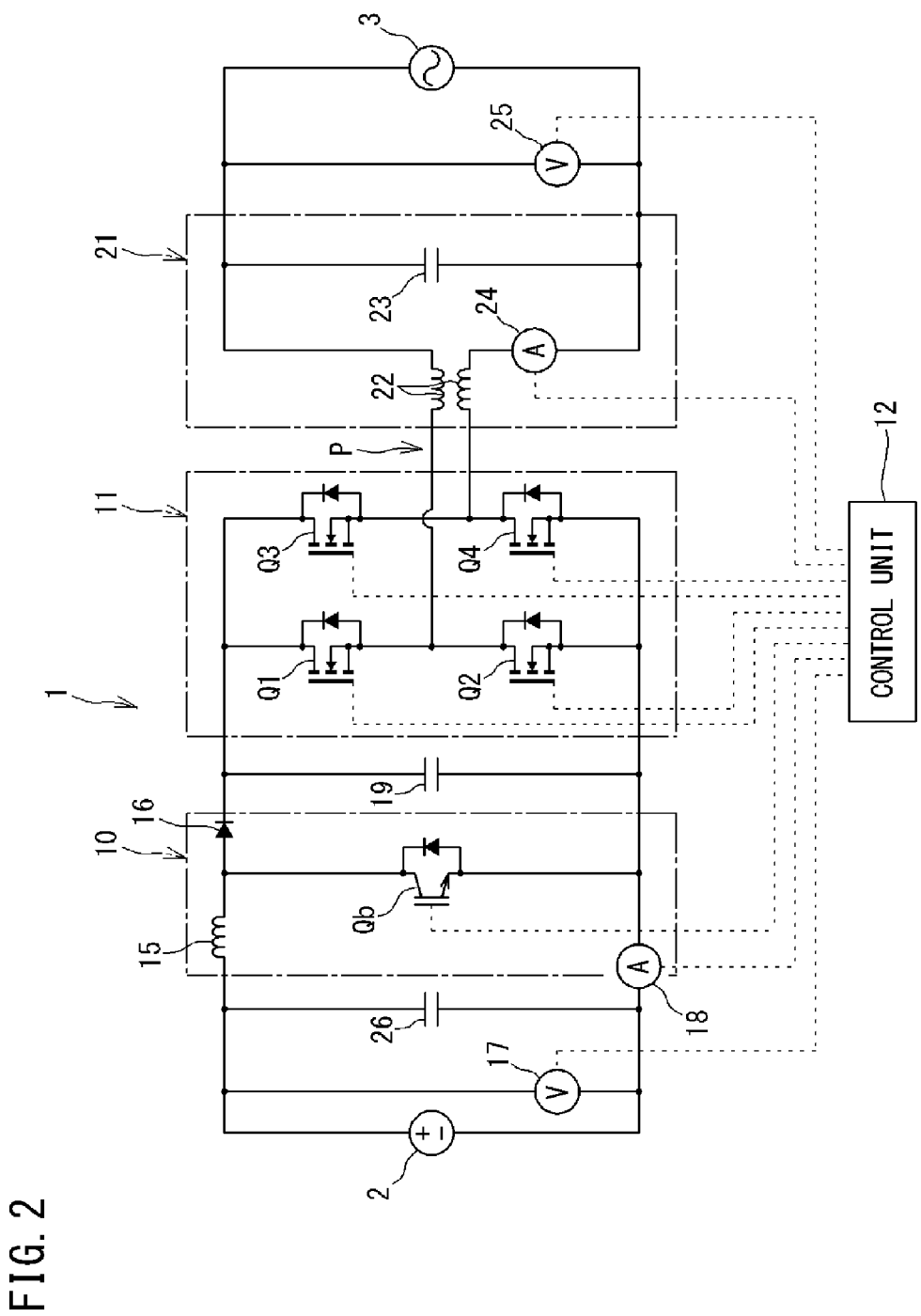
FIG. 2 is an example of a circuit diagram of the inverter device.

FIG. 2 is an example of a circuit diagram of the inverter device 1.

The step-up circuit 10 includes a DC reactor 15, a diode 16, and a switching element Qb composed of an Insulated Gate Bipolar Transistor (IGBT) or the like, to form a step-up chopper circuit.

On an input side of the step-up circuit 10, a first voltage sensor 17, a first current sensor 18, and a capacitor 26 for smoothing are provided.

The first voltage sensor 17 detects a DC input voltage detection value Vg (DC input voltage value) of DC power outputted from the photovoltaic panel 2 and then inputted to the step-up circuit 10, and outputs the DC input voltage detection value Vg to the control unit 12. The first current sensor 18 detects a step-up circuit current detection value Iin (DC input current value) of current flowing in the DC reactor 15, and outputs the step-up circuit current detection value Iin to the control unit 12. In order to detect a DC input current detection value Ig, a current sensor may be further provided at a stage preceding the capacitor 26.

The control unit 12 has a function of calculating input power Pin from the DC input voltage detection value Vg and the step-up circuit current detection value Iin and performing maximum power point tracking (MPPT) control for the photovoltaic panel 2.

As described below, the switching element Qb of the step-up circuit 10 is controlled so as to minimize a sum of the number of times the switching element Qb performs switching operation and the number of times the inverter circuit 11 performs switching operation, and a stop period arises. Therefore, during a period in which switching operation is performed in the step-up circuit 10, the step-up circuit 10 outputs stepped-up power to the inverter circuit 11, and during a period in which the switching operation is stopped, the step-up circuit 10 outputs, to the inverter circuit 11, DC power outputted from the photovoltaic panel 2 and then inputted to the step-up circuit 10, without stepping up the DC input voltage value thereof.

A capacitor 19 (smoothing capacitor) for smoothing is connected between the step-up circuit 10 and the inverter circuit 11.

The inverter circuit 11 includes switching elements Q1 to Q4 each composed of a Field Effect Transistor (FET). The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the inverter circuit 11 converts power given from the step-up circuit 10 to AC power.

The inverter device 1 includes a filter circuit 21 between the inverter circuit 11 and the commercial power system 3.

The filter circuit 21 is composed of two AC reactors 22 and a capacitor 23 (output smoothing capacitor) provided at a stage subsequent to the AC reactors 22. The filter circuit 21 has a function to remove a high-frequency component contained in AC power outputted from the inverter circuit 11. The AC power from which the high-frequency component has been removed by the filter circuit 21 is given to the commercial power system 3.

Thus, the step-up circuit 10 and the inverter circuit 11 form a conversion unit which converts DC power outputted from the photovoltaic panel 2 to AC power and outputs the converted AC power to the commercial power system 3 via the filter circuit 21.

A second current sensor 24 for detecting an inverter current detection value Iinv (current flowing in the AC reactor 22) which is a current value of output of the inverter circuit 11 is connected to the filter circuit 21. A second voltage sensor 25 for detecting a voltage value (system voltage detection value Va) on the commercial power system 3 side is connected between the filter circuit 21 and the commercial power system 3.

The second current sensor 24 and the second voltage sensor 25 respectively output the detected inverter current detection value Iinv and the detected system voltage detection value Va (the voltage value of the AC system) to the control unit 12. Although the second current sensor 24 is provided at a stage preceding the capacitor 23 as shown in FIG. 2, a third current sensor for detecting output current of the inverter device 1 may be added at a stage subsequent to the capacitor 23.

The control unit 12 controls the step-up circuit 10 and the inverter circuit 11 based on the system voltage detection value Va, the inverter current detection value Iinv, the DC input voltage detection value Vg, and the step-up circuit current detection value Iin.

[1.2 Control Unit]

Figure 3:
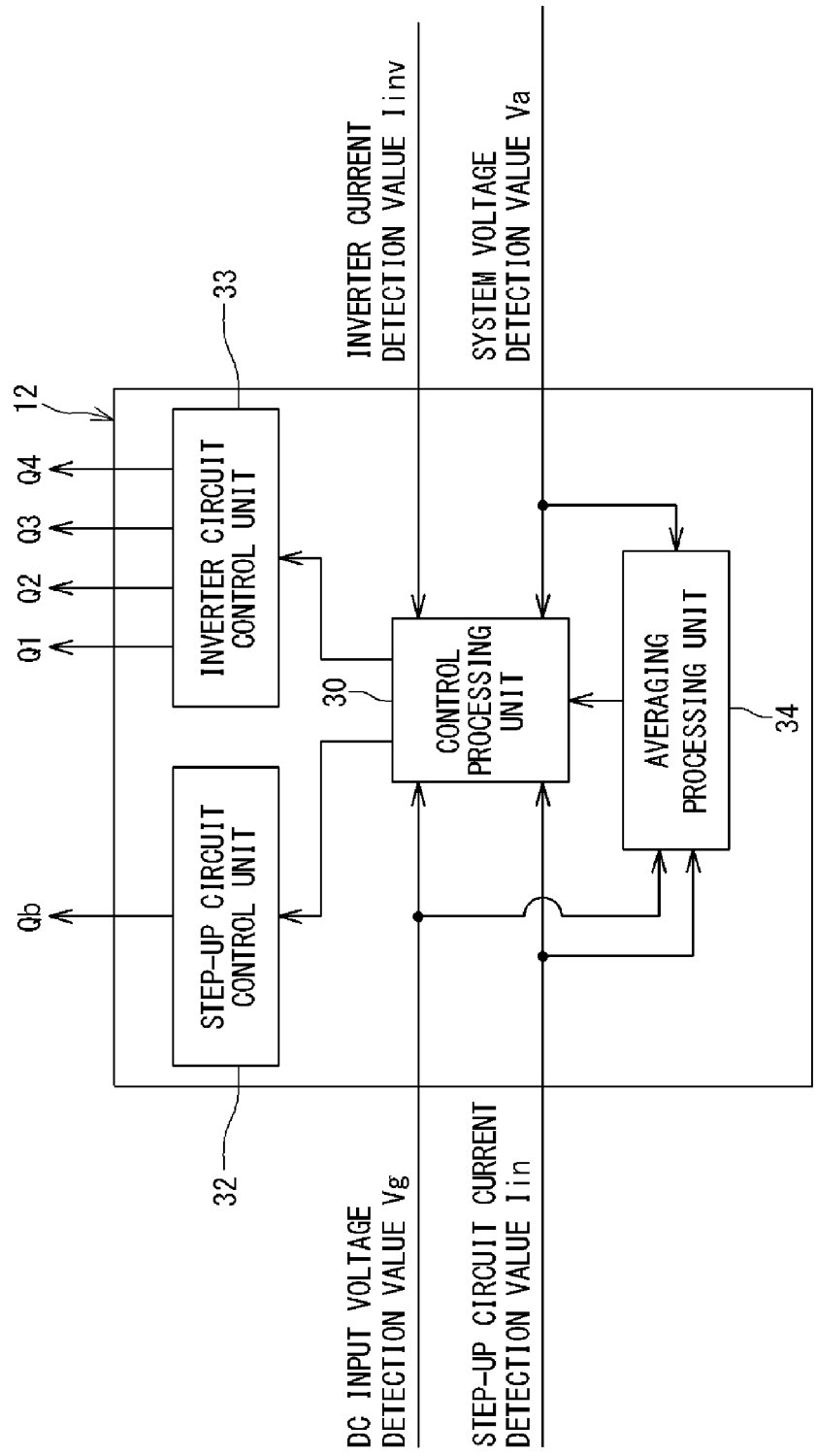
FIG. 3 is a block diagram of a control unit.

FIG. 3 is a block diagram of the control unit 12. As shown in FIG. 3, the control unit 12 functionally has a control processing unit 30, a step-up circuit control unit 32, an inverter circuit control unit 33, and an averaging processing unit 34.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The step-up circuit control unit 32 controls the switching element Qb of the step-up circuit 10 based on a target value and a detection value given from the control processing unit 30, thereby causing the step-up circuit 10 to output power having current corresponding to the target value.

The inverter circuit control unit 33 controls the switching elements Q1 to Q4 of the inverter circuit 11 based on a target value and a detection value given from the control processing unit 30, thereby causing the inverter circuit 11 to output power having current corresponding to the target value.

The control processing unit 30 receives the DC input voltage detection value Vg, the step-up circuit current detection value Iin, the system voltage detection value Va, and the inverter current detection value Iinv.

The control processing unit 30 calculates the input power Pin and an average value <Pin> thereof from the DC input voltage detection value Vg and the step-up circuit current detection value Iin.

The control processing unit 30 has a function to set a DC input current target value Ig* (which will be described later) based on the input power average value <Pin> and perform MPPT control for the photovoltaic panel 2, and to perform feedback control for the step-up circuit 10 and the inverter circuit 11.

The DC input voltage detection value Vg and the step-up circuit current detection value Iin are given to the averaging processing unit 34 and the control processing unit 30.

The averaging processing unit 34 has a function to sample, at predetermined time intervals, the DC input voltage detection value Vg and the step-up circuit current detection value Iin given from the first voltage sensor 17 and the first current sensor 18, calculate their respective average values, and give the averaged DC input voltage detection value Vg and the averaged step-up circuit current detection value Iin to the control processing unit 30.

Figure 4:
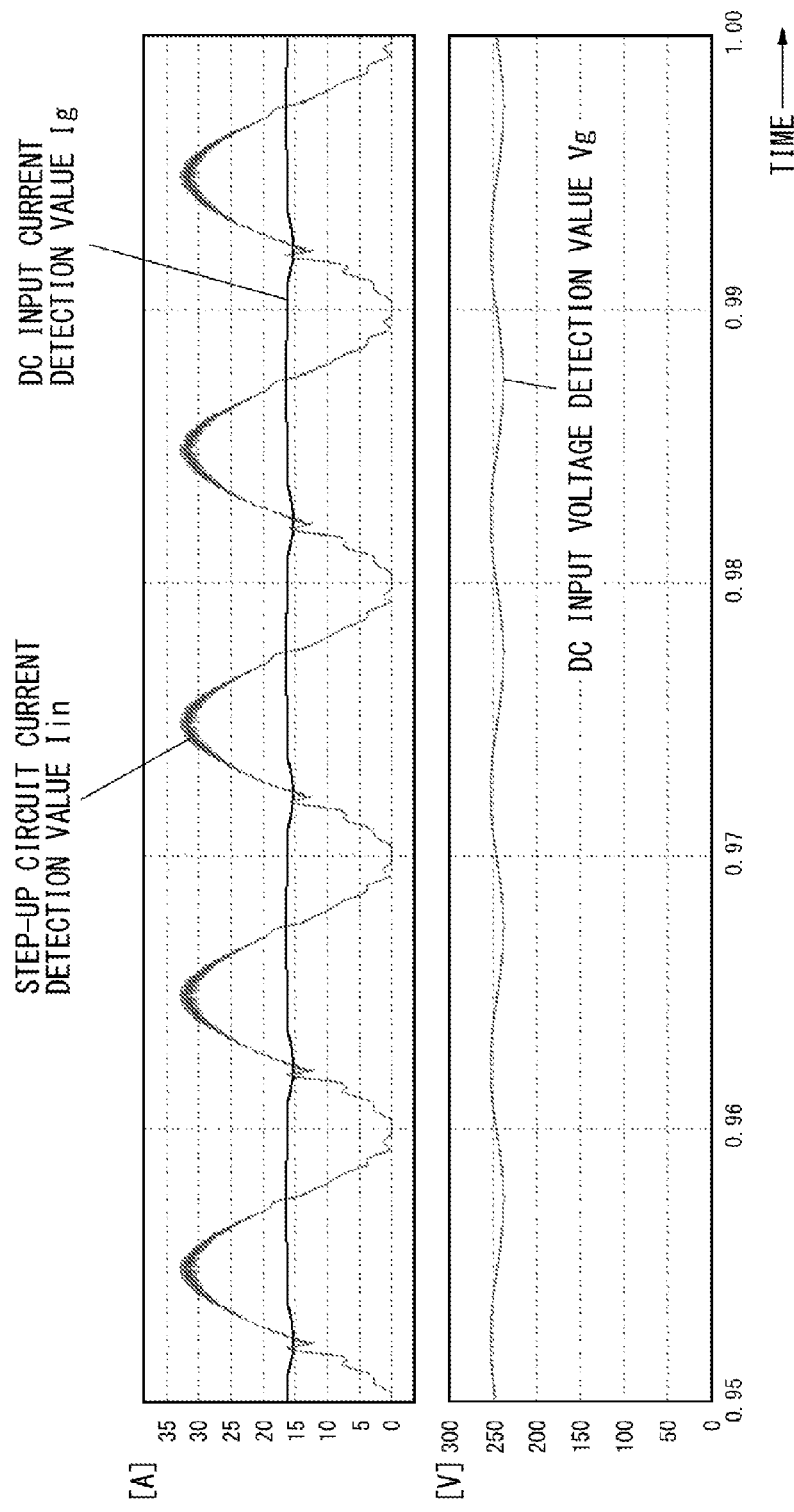
FIG. 4 is a graph showing an example of a simulation result of temporal variations in a DC input voltage detection value and a step-up circuit current detection value.

FIG. 4 is a graph showing an example of a simulation result of temporal changes in the DC input voltage detection value Vg and the step-up circuit current detection value Iin.

The DC input current detection value Ig is a current value detected on an input side relative to the capacitor 26.

As shown in FIG. 4, it is found that the DC input voltage detection value Vg, the step-up circuit current detection value Iin, and the DC input current detection value Ig vary in a half cycle of the system voltage.

The reason why the DC input voltage detection value Vg and the DC input current detection value Ig vary periodically as shown in FIG. 4 is as follows. That is, the step-up circuit current detection value Iin greatly varies between almost 0A and a peak value in a half cycle of the AC cycle in accordance with operations of the step-up circuit 10 and the inverter circuit 11. Therefore, the variation component cannot be fully removed by the capacitor 26, and the DC input current detection value Ig is detected as pulsating current containing a component that varies in a half cycle of the AC cycle. On the other hand, output voltage of the photovoltaic panel varies depending on output current.

Therefore, the cycle of the periodic variation occurring in the DC input voltage detection value Vg is half the cycle of AC power outputted from the inverter device 1.

The averaging processing unit 34 averages the DC input voltage detection value Vg and the step-up circuit current detection value Iin in order to suppress an influence of the above periodic variations.

Figure 5:
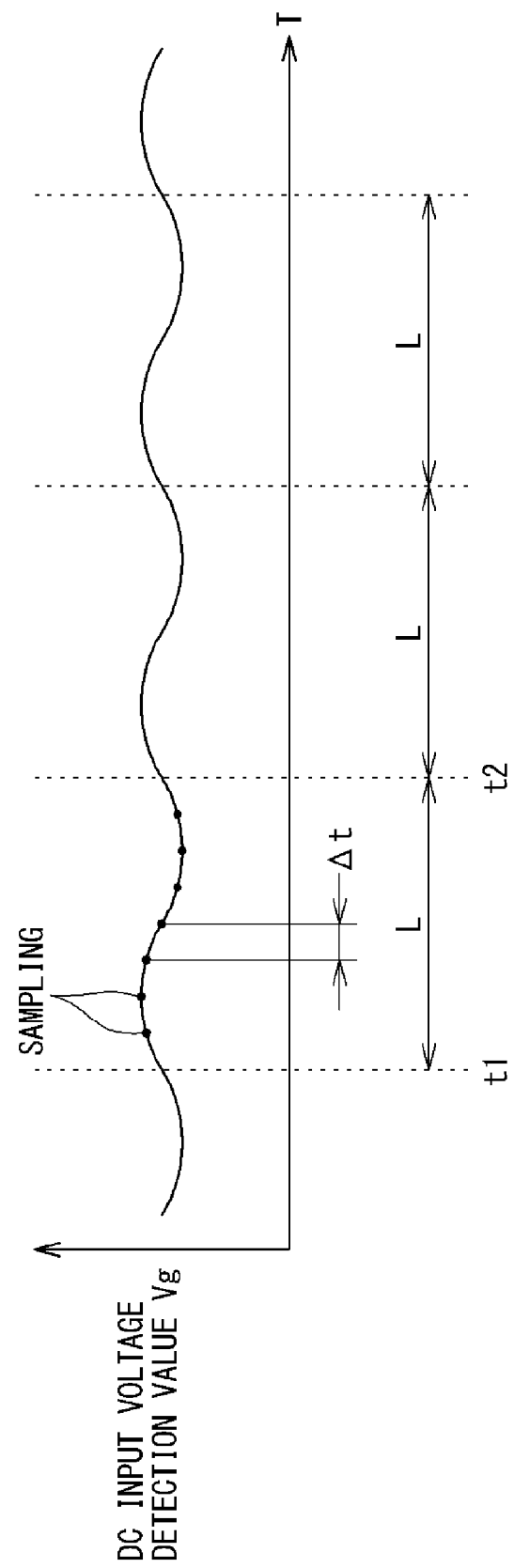
FIG. 5 is a diagram showing a manner in which an averaging processing unit averages a DC input voltage detection value Vg.

FIG. 5 is a diagram showing a manner in which the averaging processing unit 34 averages the DC input voltage detection value Vg.

The averaging processing unit 34 samples the given DC input voltage detection value Vg a plurality of times (at timings indicated by solid dots in FIG. 5) at predetermined time intervals Δt during a period L from a timing t1 to a timing t2, and calculates an average value of the plurality of DC input voltage detection values Vg that have been obtained.

Here, the averaging processing unit 34 sets the period L to half the length of the cycle of the commercial power system 3. In addition, the averaging processing unit 34 sets the time interval Δt to be sufficiently shorter than half the length of the cycle of the commercial power system 3.

Thus, the averaging processing unit 34 can accurately obtain the average value of the DC input voltage detection value Vg which periodically varies in synchronization with the cycle of the commercial power system 3, using as short a sampling period as possible.

The time interval Δt of sampling may be set at, for example, 1/100 to 1/1000 of the cycle of the commercial power system 3, or 20 microseconds to 200 microseconds.

The averaging processing unit 34 may store the period L in advance, or may acquire the system voltage detection value Va from the second voltage sensor 25 and set the period L based on the cycle of the commercial power system 3.

Here, the period L is set to half the length of the cycle of the commercial power system 3. The average value of the DC input voltage detection value Vg can be accurately calculated at least if the period L is set to half the cycle of the commercial power system 3. This is because the DC input voltage detection value Vg periodically varies in a half cycle of the commercial power system 3 in accordance with operations of the step-up circuit 10 and the inverter circuit 11 as described above.

Therefore, if it is required to set the period L to be longer, the period L may be set to an integer multiple of a half cycle of the commercial power system 3, e.g., three or four times of a half cycle of the commercial power system 3. Thus, the voltage variation can be grasped on a cycle basis.

As described above, the step-up circuit current detection value Iin also periodically varies in a half cycle of the commercial power system 3, as in the DC input voltage detection value Vg.

Therefore, the averaging processing unit 34 also calculates an average value of the step-up circuit current detection value Iin by the same method as in the DC input voltage detection value Vg shown in FIG. 5.

The control processing unit 30 sequentially calculates an average value of the DC input voltage detection value Vg and an average value of the step-up circuit current detection value Iin per the period L.

The averaging processing unit 34 gives the calculated average value of the DC input voltage detection value Vg and the calculated average value of the step-up circuit current detection value Iin to the control processing unit 30.

In the present embodiment, as described above, the averaging processing unit 34 calculates an average value (DC input voltage average value <Vg>) of the DC input voltage detection value Vg and an average value (step-up circuit current average value <Iin>) of the step-up circuit current detection value Iin, and using these values, the control processing unit 30 controls the step-up circuit 10 and the inverter circuit 11 while performing MPPT control for the photovoltaic panel 2. Therefore, even if DC current from the photovoltaic panel 2 varies to be unstable, the control unit 12 can accurately obtain output of the photovoltaic panel 2 as the DC input voltage average value <Vg> and the step-up circuit current average value <Iin> in which a variation component due to operation of the inverter device 1 has been removed. As a result, it becomes possible to appropriately perform MPPT control and effectively suppress reduction in power generation efficiency of the photovoltaic panel 2.

As described above, in a case where voltage (DC input voltage detection value Vg) or current (step-up circuit current detection value Iin) of DC power outputted from the photovoltaic panel 2 varies due to operation of the inverter device 1, the cycle of the variation coincides with a half cycle (a half cycle of the commercial power system 3) of AC power outputted from the inverter circuit 11.

In this regard, in the present embodiment, the DC input voltage detection value Vg and the step-up circuit current detection value Iin are each sampled a plurality of times at the time intervals Δt which are shorter than a half cycle of the AC system, during the period L which is set to half the length of the cycle of the commercial power system 3, and the DC input voltage average value <Vg> and the step-up circuit current average value <Iin> are calculated from a result of the sampling. Therefore, even if voltage and current of the DC current vary periodically, the DC input voltage average value <Vg> and the step-up circuit current average value <Iin> can be accurately calculated, with the sampling period shortened as much as possible.

The control processing unit 30 sets the DC input current target value Ig* based on the above input power average value <Pin>, and calculates respective target values for the step-up circuit 10 and the inverter circuit 11 based on the set DC input current target value Ig* and the above values.

The control processing unit 30 has a function of giving the calculated target values to the step-up circuit control unit 32 and the inverter circuit control unit 33 and performing feedback control for the step-up circuit 10 and the inverter circuit 11.

Figure 6:
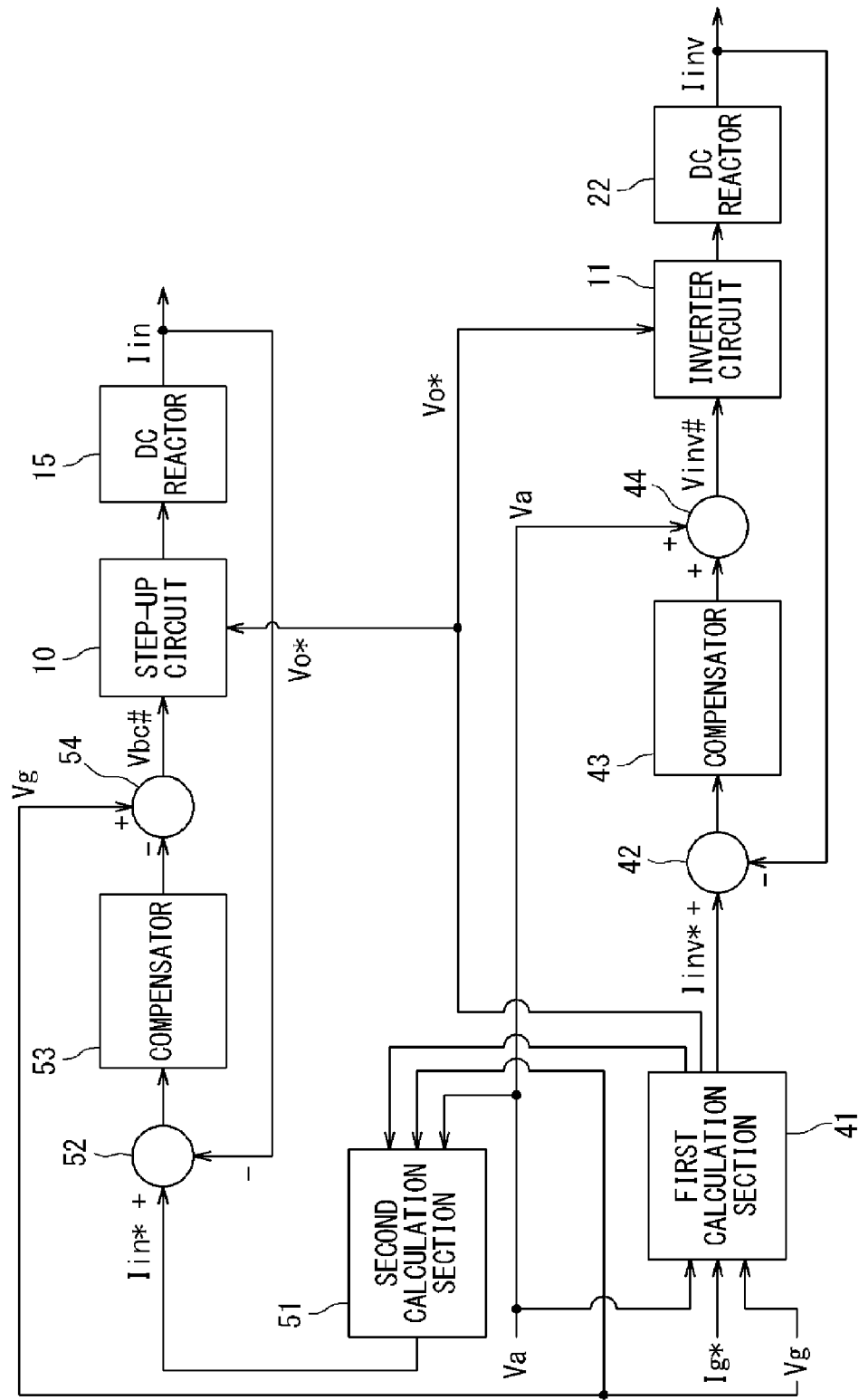
FIG. 6 is a control block diagram for explaining a control process by a control processing unit.

FIG. 6 is a control block diagram for explaining the feedback control for the step-up circuit 10 and the inverter circuit 11 by the control processing unit 30.

The control processing unit 30 includes, as function sections for controlling the inverter circuit 11, a first calculation section 41, a first adder 42, a compensator 43, and a second adder 44.

In addition, the control processing unit 30 includes, as a function section for controlling the step-up circuit 10, a second calculation section 51, a third adder 52, a compensator 53, and a fourth adder 54.

Figure 7:
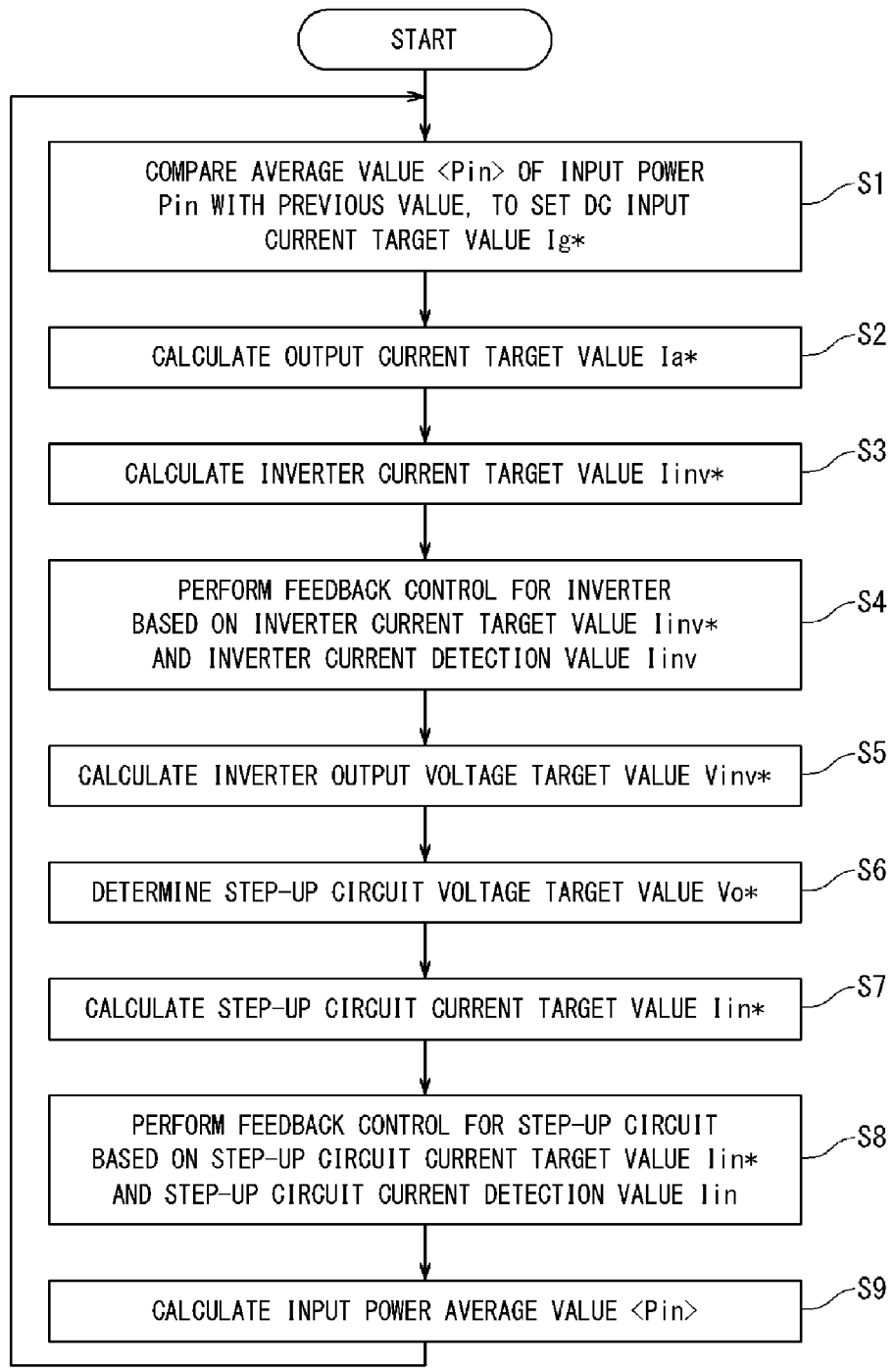
FIG. 7 is a flowchart showing a control process for a step-up circuit and an inverter circuit.

FIG. 7 is a flowchart showing a control process for the step-up circuit 10 and the inverter circuit 11. The function sections shown in FIG. 6 control the step-up circuit 10 and the inverter circuit 11 by executing the process shown in the flowchart in FIG. 7.

Hereinafter, the control process for the step-up circuit 10 and the inverter circuit 11 will be described with reference to FIG. 7.

First, the control processing unit 30 calculates the present input power average value <Pin> (step S9), and compares the present input power average value <Pin> with the input power average value <Pin> that has been previously calculated, to set the DC input current target value Ig* (step S1). The input power average value <Pin> is calculated based on the following expression (1).

$$\text{Input power average value } \langle Pin \rangle = \langle Iin \times Vg \rangle \tag{1}$$

In expression (1), Iin is the step-up circuit current detection value, and Vg is the DC input voltage detection value (DC input voltage value). For these values, the DC input voltage average value <Vg> and the step-up circuit current average value <Iin> which are the values averaged by the averaging processing unit 34 are used.

In each expression other than expression (1) and relevant to the control shown below, instantaneous values which are not averaged are used for the step-up circuit current detection value Iin and the DC input voltage detection value Vg.

A notation "< >" indicates an average value of a value in the brackets. The same applies hereinafter.

The control processing unit 30 gives the set DC input current target value Ig* to the first calculation section 41.

As well as the DC input current target value Ig*, the DC input voltage detection value Vg and the system voltage detection value Va are given to the first calculation section 41.

The first calculation section 41 calculates an average value <Ia*> of an output current target value for the inverter device 1, based on the following expression (2).

$$\text{Average value } \langle Ia^* \rangle \text{ of output current target value} = \eta \langle I_g^* \times Vg \rangle / \langle Va \rangle \tag{2}$$

where η is a constant representing the conversion efficiency of the inverter device 1.

Further, the first calculation section 41 calculates an output current target value Ia* based on the following expression (3) (step S2).

Here, the first calculation section 41 calculates the output current target value Ia* as a sine wave having the same phase as the system voltage detection value Va.

$$\text{Output current target value } Ia^* = (\sqrt{2}) \times \langle Ia^* \rangle \times \sin \omega t \tag{3}$$

As described above, the first calculation section 41 calculates the output current target value Ia* based on the input power average value <Pin> (an input power value of DC power) and the system voltage detection value Va.

Next, the first calculation section 41 calculates an inverter current target value Iinv* (a current target value for the inverter circuit) which is a current target value for controlling the inverter circuit 11, as shown by the following expression (4) (step S3).

$$\text{Inverter current target value } Iinv^* = Ia^* + sCaVa \tag{4}$$

In expression (4), Ca is an electrostatic capacitance of the capacitor 23 (output smoothing capacitor), and s is the Laplace operator.

The above expression (4) is represented as follows, using a derivative with respect to time t.

$$Iinv^* = Ia^* + Ca \times (dVa/dt) \tag{4a}$$

If current flowing through the capacitor 23 is detected and the detected current is denoted by Ica, the following expression is obtained.

$$Iinv^* = Ia^* + Ica \tag{4b}$$

In expressions (4), (4a), and (4b), the second term on the right-hand side is a value added in consideration of current flowing through the capacitor 23 of the filter circuit 21.

The output current target value Ia* is calculated as a sine wave having the same phase as the system voltage detection value Va, as shown by the above expression (3). That is, the control processing unit 30 controls the inverter circuit 11 so that current Ia (output current) of AC power outputted from the inverter device 1 has the same phase as the system voltage (system voltage detection value Va).

After calculating the inverter current target value Iinv*, the first calculation section 41 gives the inverter current target value Iinv* to the first adder 42.

The inverter circuit 11 is subjected to feedback control based on the inverter current target value Iinv*.

As well as the inverter current target value Iinv*, the present inverter current detection value Iinv is given to the first adder 42.

The first adder 42 calculates a difference between the inverter current target value Iinv* and the present inverter current detection value Iinv, and gives a result of the calculation to the compensator 43.

When the difference is given, the compensator 43 performs calculation based on a proportionality coefficient or the like, and further adds the system voltage Va by the second adder 44, thereby calculating an inverter voltage reference value Vinv# that allows the difference to converge so that the inverter current detection value Iinv becomes the inverter current target value Iinv*. A control signal obtained by comparing the inverter voltage reference value Vinv# with an output voltage target value Vo* for the DC/DC converter given from the first calculation section 41 is given to the inverter circuit control unit 33, thereby causing the inverter circuit 11 to output voltage according to the inverter voltage reference value Vinv#.

The voltage outputted from the inverter circuit 11 is given to the AC reactor 22, and then fed back as a new inverter current detection value Iinv. Then, a difference between the inverter current target value Iinv* and the inverter current detection value Iinv is calculated again by the first adder 42, and the inverter circuit 11 is controlled based on the difference as described above.

As described above, the inverter circuit 11 is subjected to feedback control based on the inverter current target value Iinv* and the inverter current detection value Iinv (step S4).

On the other hand, the inverter current target value Iinv* calculated by the first calculation section 41, as well as the DC input voltage detection value Vg and the system voltage detection value Va, is given to the second calculation section 51.

The second calculation section 51 calculates an inverter output voltage target value Vinv* (a voltage target value for the inverter circuit) based on the following expression (5) (step S5).

$$\text{Inverter output voltage target value } Vinv^* = Va + ZaIinv^* \tag{5}$$

In expression (5), Za is an impedance of the AC reactor, and s in the following is the Laplace operator.

The above expression (5) is represented as follows, using a derivative with respect to time t.

$$Vinv^* = Va + RaIinv^* + La \times (dIinv^*/dt) \tag{5a}$$

where Ra is a resistance of the AC reactor, La is an inductance of the AC reactor, and (Za=Ra+sLa) is satisfied.

The second term on the right-hand side in expression (5) and the second term and the third term on the right-hand side in expression (5a) are values added in consideration of voltage generated between both ends of the AC reactor 22.

Thus, in the present embodiment, the inverter output voltage target value Vinv* is set based on the inverter current target value Iinv* which is the current target value for controlling the inverter circuit 11 so that current of AC power outputted from the inverter device 1 has the same phase as the system voltage detection value Va.

As described above, the output target values (Iinv*, Vinv*) for the inverter circuit 11 which are target values on the AC side are set at a bridge output end of the inverter circuit 11, i.e., a circuit connection point P between the inverter circuit 11 and the filter circuit 21. Thus, the system interconnection is performed such that a point where the target values are set is moved to a stage preceding the original system interconnection point (a circuit connection point between the commercial power system 3 and the filter circuit 21), whereby appropriate system interconnection is finally reached.

After calculating the inverter output voltage target value Vinv*, the second calculation section 51 compares the voltage Vg or preferably the following DC voltage Vgf, as voltage $V_{DC}$ on the DC power supply side, with an absolute value of the inverter output voltage target value Vinv*, and determines the greater one to be the step-up circuit voltage target value Vo* as shown by the following expression (6) (step S6). The DC voltage Vgf is voltage calculated by considering voltage drop due to an impedance Z of the DC reactor 15 for Vg, and in a case where the step-up circuit current is denoted by Iin, Vgf is represented as Vgf=Vg−ZIin. Accordingly, Vo* can be represented as follows.

$$Vo^* = \text{Max}(Vg - ZIin, \text{absolute value of } Vinv^*) \quad (6)$$

The above expression (6) is represented as follows, using a derivative with respect to time t.

$$Vo^* = \text{Max}(Vg - (RIin + L(dIin/dt)), \text{absolute value of } Vinv^*) \quad (6a)$$

where R is a resistance of the DC reactor, L is an inductance of the DC reactor, and (Z=R+sL) is satisfied.

Further, the second calculation section 51 calculates the step-up circuit current target value Iin* based on the following expression (7) (step S7).

$$\text{Step-up circuit current target value } Iin^* = \{(Iinv^* \times Vinv^*) + (sCVo^*) \times Vo^*\}/(Vg - ZIin) \quad (7)$$

In expression (7), C is an electrostatic capacitance of the capacitor 19 (smoothing capacitor), and s is the Laplace operator.

The above expression (7) is represented as follows, using a derivative with respect to time t.

$$Iin^* = \{(Iinv^* \times Vinv^*) + C \times (dVo^*/dt) \times Vo^*\}/\{Vg - (R + sL)Iin\} \quad (7a)$$

If current flowing through the capacitor 19 is detected and the detected current is denoted by Ic, the following expression is obtained.

$$Iin^* = \{(Iinv^* \times Vinv^*) + Ic \times Vo^*\}/\{Vg - ZIin\} \quad (7b)$$

In expressions (7), (7a), and (7b), a term added to a product of the inverter current target value Iinv* and the inverter output voltage target value Vinv* is a value added in consideration of reactive power passing through the capacitor 19. That is, consideration of the reactive power in addition to the power target value for the inverter circuit 11 allows for more accurate calculation of the value of Iin*.

Further, if power loss $P_{LOSS}$ of the inverter device 1 is measured in advance, the above expression (7a) can be represented as follows.

$$Iin^* = \{(Iinv^* \times Vinv^*) + C \times (dVo^*/dt) \times Vo^* + P_{LOSS}\}/\{Vg - ZIin\} \quad (7c)$$

Similarly, the above expression (7b) can be represented as follows.

$$Iin^* = \{(Iinv^* \times Vinv^*) + Ic \times Vo^* + P_{LOSS}\}/\{Vg - ZIin\} \quad (7d)$$

In this case, consideration of the reactive power and the power loss $P_{LOSS}$ in addition to the power target value of the inverter circuit 11 allows for more strict calculation of the value of Iin*.

If the electrostatic capacitance C and the power loss $P_{LOSS}$ of the capacitor 19 are sufficiently smaller than (Iinv*× Vinv*), the following expression (8) is obtained. Iin* calculated by this expression (8) can be used as Iin contained in the right-hand sides of expressions (6), (6a), (7), (7a), (7b), (7c), and (7d).

$$\text{Step-up circuit current target value } Iin^* = (Iinv^* \times Vinv^*)/Vg \quad (8)$$

After calculating the step-up circuit current target value Iin*, the second calculation section 51 gives the step-up circuit current target value Iin* to the third adder 52.

The step-up circuit 10 is subjected to feedback control based on the step-up circuit current target value Iin*.

As well as the step-up circuit current target value Iin*, the present step-up circuit current detection value Iin is given to the third adder 52.

The third adder 52 calculates a difference between the step-up circuit current target value Iin* and the present step-up circuit current detection value Iin, and gives a result of the calculation to the compensator 53.

When the above difference is given, the compensator 53 performs calculation based on a proportionality coefficient or the like, and further subtracts the resultant value from the DC input voltage detection value Vg by the fourth adder 54, thereby calculating a step-up circuit voltage reference value Vbc# that allows the difference to converge so that the step-up circuit current detection value Iin becomes the step-up circuit current target value Iin*. A control signal obtained by comparing the step-up circuit voltage reference value Vbc# with the output voltage target value Vo* for the DC/DC converter given from the first calculation section 41 is given to the step-up circuit control unit 32, thereby causing the step-up circuit 10 to output voltage according to the step-up circuit voltage reference value Vbc#.

The power outputted from the step-up circuit 10 is given to the DC reactor 15, and then fed back as a new step-up circuit current detection value Iin. Then, a difference between the step-up circuit current target value Iin* and the step-up circuit current detection value Iin is calculated again by the third adder 52, and the step-up circuit 10 is controlled based on the difference as described above.

As described above, the step-up circuit 10 is subjected to feedback control based on the step-up circuit current target value Iin* and the step-up circuit current detection value Iin (step S8).

After the above step S8, the control processing unit 30 calculates the present input power average value <Pin> based on the above expression (1) (step S9).

Based on comparison with the input power average value <Pin> that has been previously calculated, the control processing unit 30 sets the DC input current target value Ig* so that the input power average value <Pin> becomes a maximum value (follows the maximum power point).

Thus, the control processing unit 30 controls the step-up circuit 10 and the inverter circuit 11 while performing MPPT control for the photovoltaic panel 2.

As described above, the control processing unit 30 performs feedback control for the inverter circuit 11 and the step-up circuit 10 by the current target values.

Figure 8:
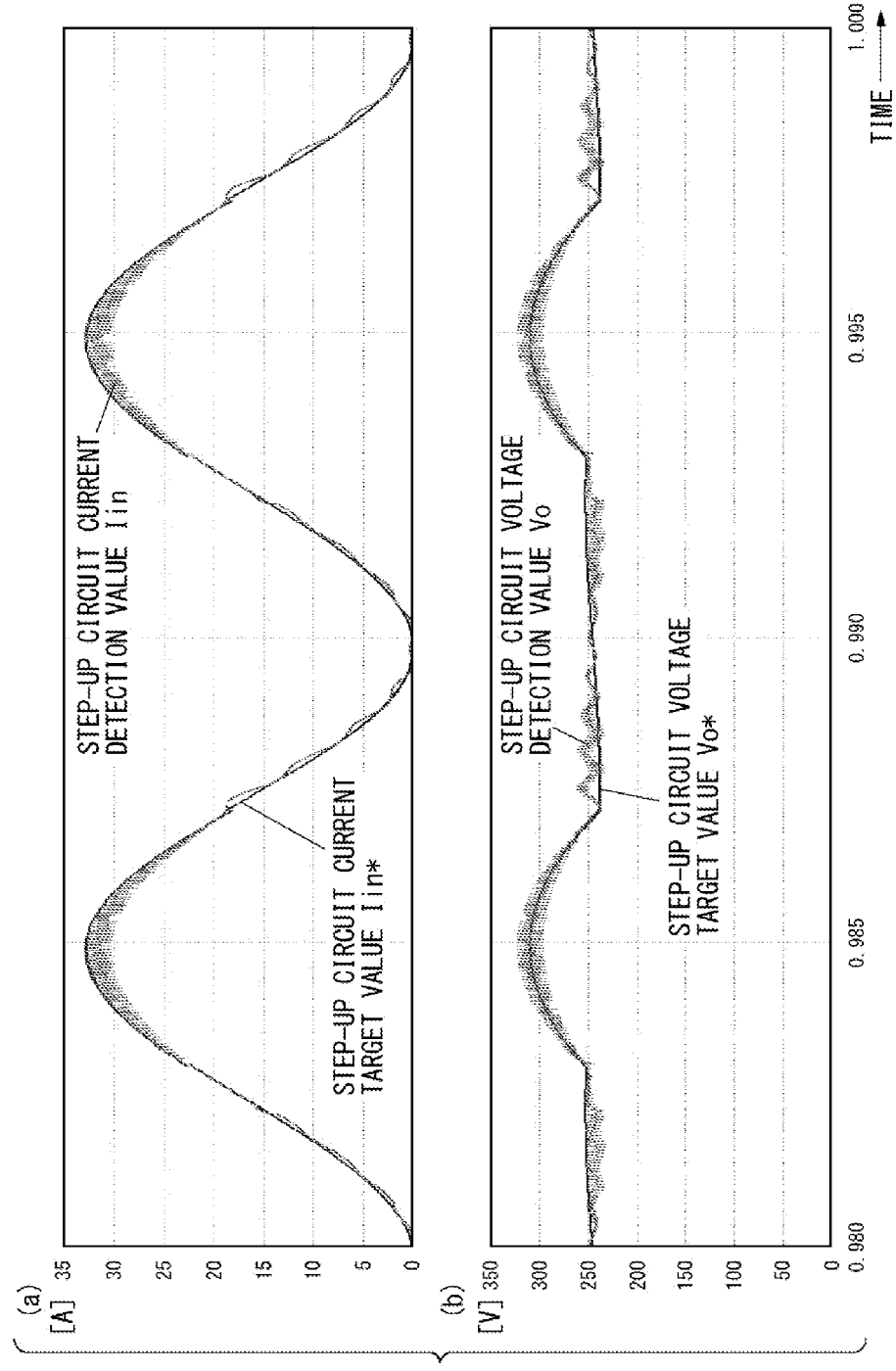
FIG. 8 is graphs in which (a) shows an example of a simulation result of a step-up circuit current target value calculated in a feedback control by the control processing unit, and a step-up circuit current detection value obtained when control is performed in accordance with the step-up circuit current target value, and (b) shows an example of a simulation result of a step-up circuit voltage target value calculated in the feedback control by the control processing unit, and a step-up circuit voltage detection value obtained when control is performed in accordance with the step-up circuit voltage target value.

FIG. 8 is graphs in which (a) shows an example of a simulation result of the step-up circuit current target value Iin* calculated in the above feedback control by the control processing unit 30, and the step-up circuit current detection value Iin obtained when control is performed in accordance with the step-up circuit current target value Iin*, and (b) shows an example of a simulation result of the step-up circuit voltage target value Vo* calculated in the above feedback control by the control processing unit 30, and a step-up circuit voltage detection value Vo obtained when control is performed in accordance with the step-up circuit voltage target value Vo*.

As shown in (a) of FIG. 8, it is found that the step-up circuit current detection value Iin is controlled along the step-up circuit current target value Iin* by the control processing unit 30.

As shown in (b) of FIG. 8, since the step-up circuit voltage target value Vo* is calculated by the above expression (6), the step-up circuit voltage target value Vo* varies so as to follow an absolute value of the inverter output voltage target value Vinv* during a period in which the absolute value of the inverter output voltage target value Vinv* is generally equal to or greater than the DC input voltage detection value Vg, and follow the DC input voltage detection value Vg during the other period.

It is found that the step-up circuit voltage detection value Vo is controlled along the step-up circuit voltage target value Vo* by the control processing unit 30.

Figure 9:
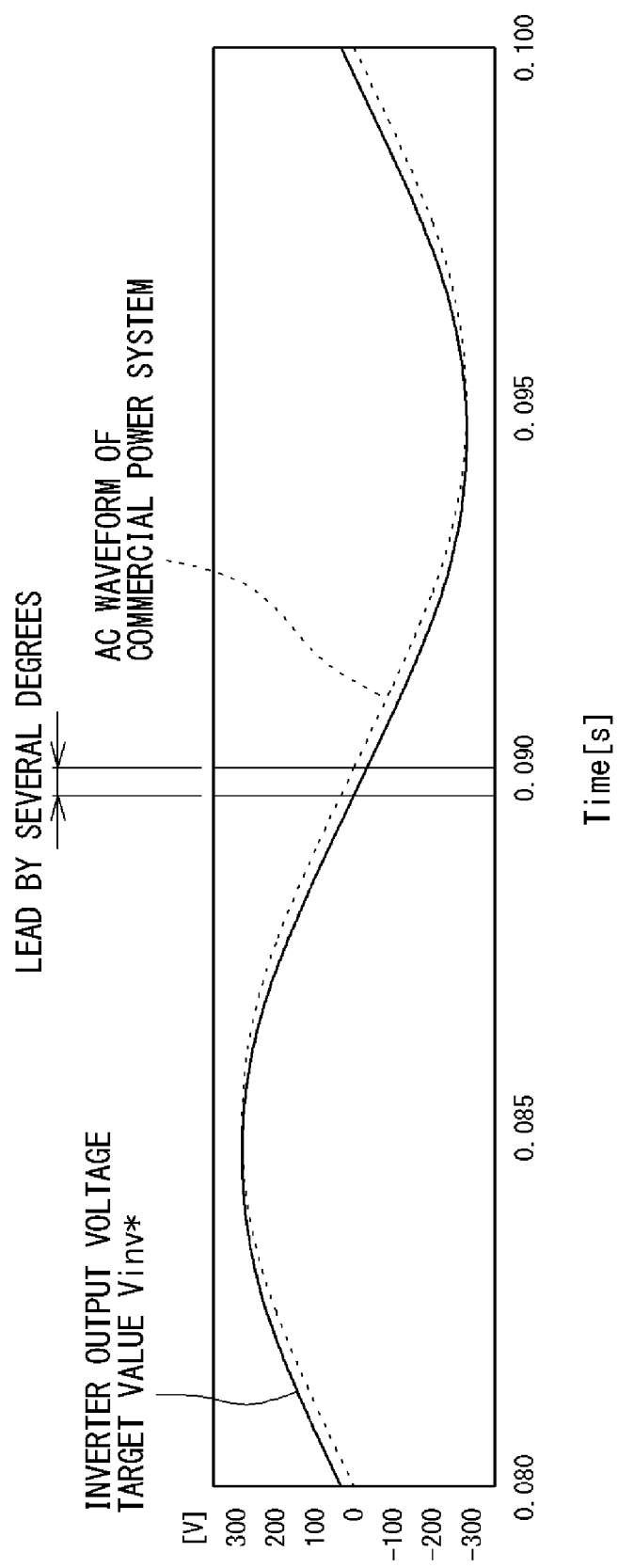
FIG. 9 is a diagram showing an example of an inverter output voltage target value.

FIG. 9 is a diagram showing an example of the inverter output voltage target value Vinv*. In FIG. 9, the vertical axis indicates voltage and the horizontal axis indicates time. A broken line indicates a voltage waveform of the commercial power system 3, and a solid line indicates a waveform of the inverter output voltage target value Vinv*.

The inverter circuit 11 outputs power, using the inverter output voltage target value Vinv* shown in FIG. 9 as a voltage target value, through the control according to the flowchart in FIG. 7.

Therefore, the inverter circuit 11 outputs power having voltage according to the waveform of the inverter output voltage target value Vinv* shown in FIG. 9.

As shown in FIG. 9, the two waveforms have almost the same voltage value and the same frequency, but the phase of the inverter output voltage target value Vinv* leads the phase of voltage of the commercial power system 3 by several degrees.

The control processing unit 30 of the present embodiment causes the phase of the inverter output voltage target value Vinv* to lead the phase of voltage of the commercial power system 3 by about three degrees while executing the feedback control for the step-up circuit 10 and the inverter circuit 11, as described above.

The degree of angle by which the phase of the inverter output voltage target value Vinv* is caused to lead the phase of voltage of the commercial power system 3 may be several degrees, and as described later, the degree of angle is set within such a range that the phase of a voltage waveform of a difference from a voltage waveform of the commercial power system 3 leads the phase of the voltage waveform of the commercial power system 3 by 90 degrees. For example, the degree of the phase leading angle is set to be greater than 0 degrees and smaller than 10 degrees.

The degree of the phase leading angle is determined by the system voltage detection value Va, the inductance La of the AC reactor 22, and the inverter current target value Iinv* as shown by the above expression (5). Of these values, the system voltage detection value Va and the inductance La of the AC reactor 22 are fixed values that are not control targets. Therefore, the degree of the phase leading angle is determined by the inverter current target value Iinv*.

The inverter current target value Iinv* is determined by the output current target value Ia* as shown by the above expression (4). As the output current target value Ia* increases, a phase leading component of the inverter current target value Iinv* increases, and a leading angle (phase leading angle) of the inverter output voltage target value Vinv* increases.

Since the output current target value Ia* is calculated by the above expression (2), the phase leading angle is adjusted by the DC input current target value Ig*.

[1.3 Control for Step-Up Circuit and Inverter Circuit]

The step-up circuit control unit 32 controls the switching element Qb of the step-up circuit 10. The inverter circuit control unit 33 controls the switching elements Q1 to Q4 of the inverter circuit 11.

The step-up circuit control unit 32 and the inverter circuit control unit 33 respectively generate a step-up circuit carrier wave and an inverter circuit carrier wave, and respectively modulate these carrier waves with the step-up circuit voltage reference value Vbc# and the inverter voltage reference value Vinv# which are target values given from the control processing unit 30, to generate drive waveforms for driving each switching element.

The step-up circuit control unit 32 and the inverter circuit control unit 33 control each switching element based on the drive waveforms, thereby causing the step-up circuit 10 and the inverter circuit 11 to output AC powers having current waveforms approximate to the step-up circuit current target value Iin* and the inverter current target value Iinv*, respectively.

Figure 10:
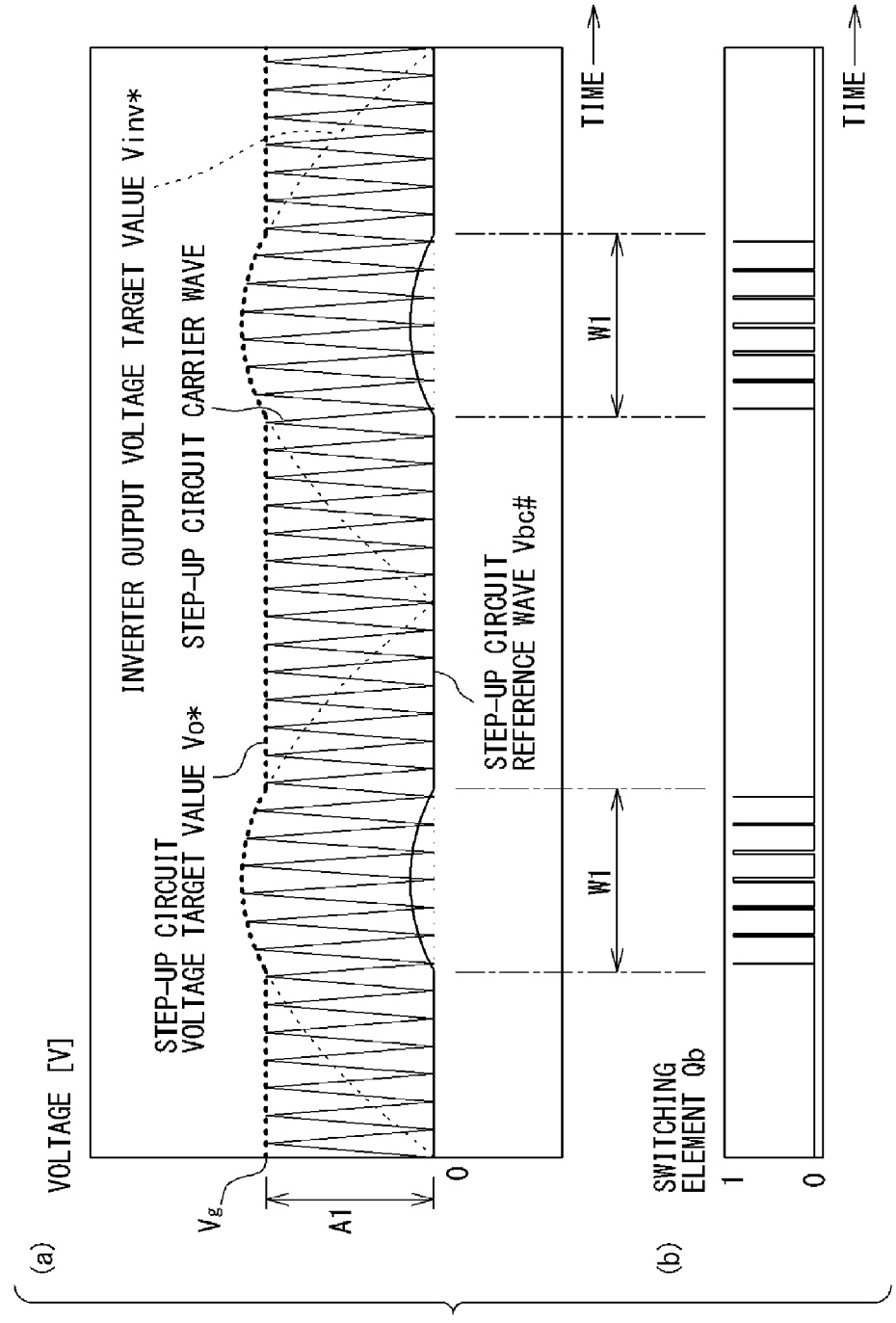
FIG. 10 is graphs in which (a) shows comparison between a step-up circuit carrier wave and a step-up circuit reference wave, and (b) shows a drive waveform for driving a switching element Qb, generated by a step-up circuit control unit.

In FIG. 10, (a) is a graph showing comparison between the step-up circuit carrier wave and a waveform of the step-up circuit voltage reference value Vbc#. In (a) of FIG. 10, the vertical axis indicates voltage and the horizontal axis indicates time. In (a) of FIG. 10, for facilitating the understanding, the wavelength of the step-up circuit carrier wave is elongated as compared to the actual wavelength.

The step-up circuit carrier wave generated by the step-up circuit control unit 32 is a triangle wave having a minimum value of "0", and has an amplitude A1 set at the step-up circuit voltage target value Vo* given from the control processing unit 30.

The frequency of the step-up circuit carrier wave is set by the step-up circuit control unit 32 in accordance with a control command from the control processing unit 30, so as to realize a predetermined duty ratio.

As described above, the step-up circuit voltage target value Vo* varies so as to follow an absolute value of the inverter output voltage target value Vinv* during a period W1 in which the absolute value of the inverter output voltage target value Vinv* is generally equal to or greater than the DC input voltage detection value Vg, and follow the DC input voltage detection value Vg during the other period. Therefore, the amplitude A1 of the step-up circuit carrier wave also varies in accordance with the step-up circuit voltage target value Vo*.

In the present embodiment, the DC input voltage detection value Vg is 250 volts, and the amplitude of voltage of the commercial power system 3 is 288 volts.

A waveform (hereinafter, may be referred to as a step-up circuit reference wave Vbc#) of the step-up circuit voltage reference value Vbc# corresponds to a value calculated based on the step-up circuit current target value Iin* by the control processing unit 30, and has a positive value during the period W1 in which the absolute value of the inverter output voltage target value Vinv* is greater than the DC input voltage detection value Vg. During the period W1, the step-up circuit reference wave Vbc# has a waveform approximate to the shape of a waveform created by the step-up circuit voltage target value Vo*, and crosses the step-up circuit carrier wave.

The step-up circuit control unit 32 compares the step-up circuit carrier wave with the step-up circuit reference wave Vbc#, and generates a drive waveform for driving the switching element Qb so as to be turned on during a period in which the step-up circuit reference wave Vbc# which is a target value for voltage between both ends of the DC reactor 15 is equal to or greater than the step-up circuit carrier wave, and to be turned off during a period in which the step-up circuit reference wave Vbc# is equal to or smaller than the carrier wave.

In FIG. 10, (b) shows the drive waveform for driving the switching element Qb, generated by the step-up circuit control unit 32. In (b) of FIG. 10, the vertical axis indicates voltage and the horizontal axis indicates time. The horizontal axis in (b) of FIG. 10 coincides with that in (a) of FIG. 10.

The drive waveform indicates switching operation of the switching element Qb. When the drive waveform is given to the switching element Qb, the switching element Qb is caused to perform switching operation in accordance with the drive waveform. The drive waveform forms a control command to turn off the switching element when the voltage is 0 volts and turn on the switching element when the voltage is a plus voltage.

The step-up circuit control unit 32 generates the drive waveform so that the switching operation is performed during the period W1 in which the absolute value of the inverter output voltage target value Vinv* is equal to or greater than the DC input voltage detection value Vg. Therefore, in a range in which the absolute value is equal to or smaller than the DC input voltage detection value Vg, the switching element Qb is controlled to stop the switching operation.

Each pulse width is determined by an intercept of the step-up circuit carrier wave which is a triangle wave. Therefore, the pulse width is greater at a part where voltage is higher.

As described above, the step-up circuit control unit 32 modulates the step-up circuit carrier wave with the step-up circuit reference wave Vbc#, to generate the drive waveform representing pulse widths for switching. The step-up circuit control unit 32 performs PWM control for the switching element Qb of the step-up circuit 10, based on the generated drive waveform.

In the case where a switching element Qbu that conducts current in a forward direction of the diode 16 is provided in parallel with the diode 16, a drive waveform inverted from the drive waveform for the switching element Qb is used for the switching element Qbu. In order to prevent the switching element Qb and the switching element Qbu from conducting currents at the same time, a dead time of about 1 microsecond is provided at a part where a drive pulse for the switching element Qbu shifts from OFF to ON.

Figure 11:
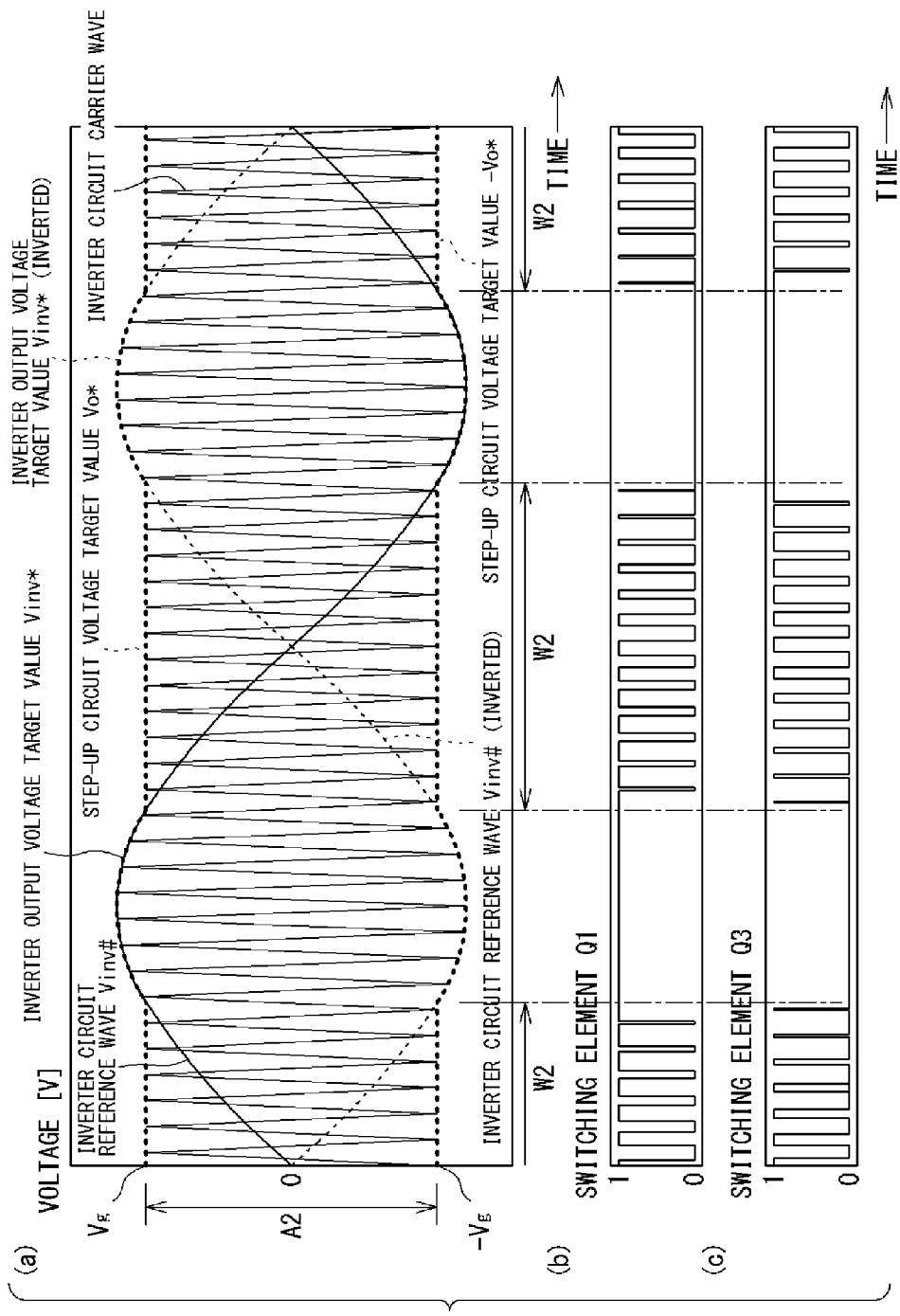
FIG. 11 is graphs in which (a) shows comparison between an inverter circuit carrier wave and an inverter circuit reference wave, (b) shows a drive waveform for driving a switching element Q1, generated by an inverter circuit control unit, and (c) shows a drive waveform for driving a switching element Q3, generated by the inverter circuit control unit.

In FIG. 11, (a) is a graph showing comparison between the inverter circuit carrier wave and a waveform of the inverter voltage reference value Vinv#. In (a) of FIG. 11, the vertical axis indicates voltage and the horizontal axis indicates time. Also in (a) of FIG. 11, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the step-up circuit voltage target value Vo* (a voltage target value for the capacitor 23). Therefore, the inverter circuit carrier wave has a period in which an amplitude A2 thereof is twice (500 volts) as great as the DC input voltage detection value Vg and a period in which the amplitude A2 is twice (576 volts at maximum) as great as voltage of the commercial power system 3.

The frequency thereof is set by the inverter circuit control unit 33 in accordance with a control command from the control processing unit 30, or the like, so as to realize a predetermined duty ratio.

As described above, the step-up circuit voltage target value Vo* varies to follow an absolute value of the inverter output voltage target value Vinv* during the period W1 in which the absolute value of the inverter output voltage target value Vinv* is generally equal to or greater than the DC input voltage detection value Vg, and follow the DC input voltage detection value Vg during the other period, i.e., a period W2. Therefore, the amplitude A2 of the inverter circuit carrier wave also varies in accordance with the step-up circuit voltage target value Vo*.

A waveform (hereinafter, may be referred to as an inverter circuit reference wave Vinv#) of the inverter voltage reference value Vinv# corresponds to a value calculated based on the inverter current target value Iinv* by the control processing unit 30, and is set to have generally the same amplitude as the voltage amplitude (288 volts) of the commercial power system 3. Therefore, the inverter circuit reference wave Vinv# crosses the inverter circuit carrier wave in a range where the voltage value is between −Vg and +Vg.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# which is a voltage target value is equal to or greater than the inverter circuit carrier wave, and to be turned off during a period in which the inverter circuit reference wave Vinv# is equal to or smaller than the carrier wave.

In FIG. 11, (b) shows the drive waveform for driving the switching element Q1, generated by the inverter circuit control unit 33. In (b) of FIG. 11, the vertical axis indicates voltage and the horizontal axis indicates time. The horizontal axis in (b) of FIG. 11 coincides with that in (a) of FIG. 11.

The inverter circuit control unit 33 generates the drive waveform so that the switching operation is performed in the range W2 in which voltage of the inverter circuit reference wave Vinv# is between −Vg and +Vg. Therefore, in the other range, the switching element Q1 is controlled to stop the switching operation.

In FIG. 11, (c) shows the drive waveform for driving the switching element Q3, generated by the inverter circuit control unit 33. In (c) of FIG. 11, the vertical axis indicates voltage and the horizontal axis indicates time.

The inverter circuit control unit 33 compares the carrier wave with a waveform indicated by a broken line in (a) of FIG. 11, which is inverted from the inverter circuit reference wave Vinv#, to generate the drive waveform for the switching element Q3.

Also in this case, the inverter circuit control unit 33 generates the drive waveform so that the switching operation is performed in the range W2 in which voltage of (a waveform inverted from) the inverter circuit reference wave Vinv# is between −Vg and +Vg. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the inverter circuit 11, based on the generated drive waveforms.

The step-up circuit control unit 32 of the present embodiment causes the step-up circuit 10 to output power so that current flowing in the DC reactor 15 coincides with the step-up circuit current target value Iin*. As a result, the step-up circuit 10 is caused to perform switching operation during the period W1 (FIG. 10) in which an absolute value of the inverter output voltage target value Vinv* is generally equal to or greater than the DC input voltage detection value Vg. The step-up circuit 10 outputs power having voltage equal to or greater than the DC input voltage detection value Vg and approximate to the absolute value of the inverter output voltage target value Vinv*, during the period W1. On the other hand, during the period in which the absolute value of the inverter output voltage target value Vinv* is generally equal to or smaller than the DC input voltage detection value Vg, the step-up circuit control unit 32 stops the switching operation of the step-up circuit 10. Therefore, during the period in which the absolute value is equal to or smaller than the DC input voltage detection value Vg, the step-up circuit 10 outputs, to the inverter circuit 11, DC power outputted from the photovoltaic panel 2 without stepping up the DC input voltage value thereof.

The inverter circuit control unit 33 of the present embodiment causes the inverter circuit 11 to output power so that current flowing in the AC reactor 22 coincides with the inverter current target value Iinv*. As a result, the inverter circuit 11 is caused to perform switching operation during the period W2 (FIG. 11) in which the inverter output voltage target value Vinv* is generally between −Vg and +Vg. That is, the inverter circuit 11 is caused to perform switching operation during a period in which an absolute value of the inverter output voltage target value Vinv* is equal to or smaller than the DC input voltage detection value Vg.

Therefore, while switching operation of the step-up circuit 10 is stopped, the inverter circuit 11 performs switching operation to output AC power approximate to the inverter output voltage target value Vinv*.

Since the inverter circuit reference wave Vinv# and the inverter output voltage target value Vinv* are approximate to each other, they overlap each other in (a) of FIG. 11.

On the other hand, in the period other than the period W2 in which voltage of the inverter output voltage target value Vinv* is generally between −Vg and +Vg, the inverter circuit control unit 33 stops the switching operation of the inverter circuit 11. During this period, power stepped up by the step-up circuit 10 is given to the inverter circuit 11. Therefore, the inverter circuit 11 whose switching operation is stopped outputs the power given from the step-up circuit 10, without stepping down the voltage thereof.

That is, the inverter device 1 of the present embodiment causes the step-up circuit 10 and the inverter circuit 11 to perform switching operations so as to be alternately switched therebetween, and superimposes their respective output powers on each other, thereby outputting AC power having a voltage waveform approximate to the inverter output voltage target value Vinv*.

Thus, in the present embodiment, control is performed so that the step-up circuit 10 is operated in a case of outputting voltage corresponding to the part where the absolute value of the inverter output voltage target value Vinv* is higher than the DC input voltage detection value Vg, and the inverter circuit 11 is operated in a case of outputting voltage corresponding to the part where the absolute value of the inverter output voltage target value Vinv* is lower than the DC input voltage detection value Vg. Therefore, since the inverter circuit 11 does not step down the power that has been stepped up by the step-up circuit 10, a potential difference in stepping down of the voltage can be reduced, whereby loss due to switching of the step-up circuit is reduced and AC power can be outputted with increased efficiency.

Further, since both the step-up circuit 10 and the inverter circuit 11 operate based on the inverter output voltage target value Vinv* set by the control unit 12, occurrence of deviation or distortion between power of the step-up circuit and power of the inverter circuit which are outputted so as to be alternately switched can be suppressed.

Figure 12:
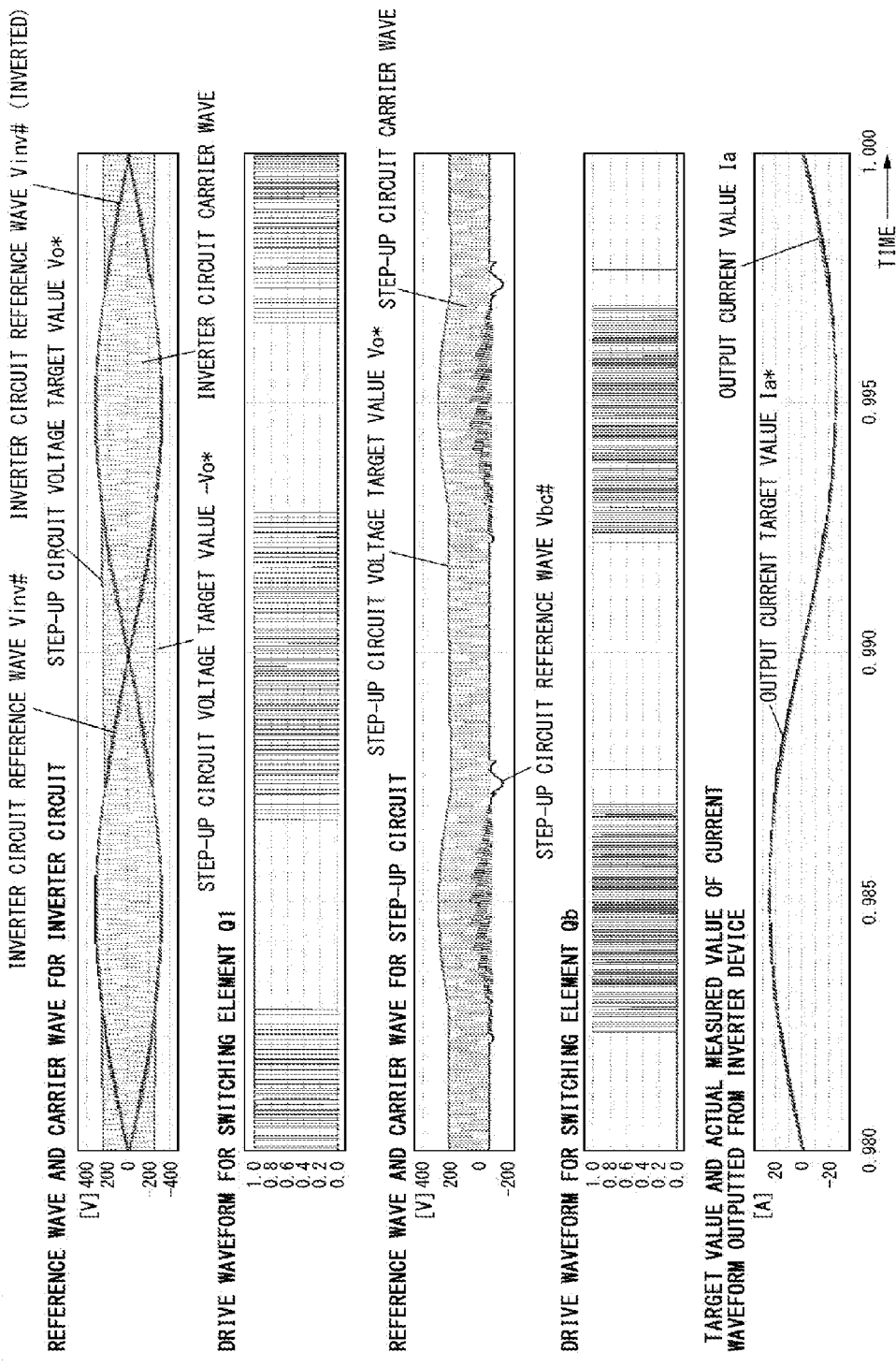
FIG. 12 is a diagram showing examples of reference waves and drive waveforms for switching elements, and an example of a current waveform of AC power outputted from the inverter device.

FIG. 12 is a diagram showing examples of the reference waves and the drive waveforms for the switching elements, and an example of a current waveform of AC power outputted from the inverter device 1.

FIG. 12 shows graphs of, from the uppermost side, the reference wave Vinv# and the carrier wave for the inverter circuit, the drive waveform for the switching element Q1, the reference wave Vbc# and the carrier wave for the step-up circuit, the drive waveform for the switching element Qb, and the target value and an actual measured value of a current waveform of AC power outputted from the inverter device 1. The horizontal axes of these graphs indicate time, and coincide with each other.

As shown in FIG. 12, it is found that output current is controlled so that an actual measured value Ia thereof coincides with a target value Ia*.

In addition, it is found that the period in which the switching element Qb of the step-up circuit 10 performs switching operation and the period in which the switching elements Q1 to Q4 of the inverter circuit 11 perform switching operations are controlled so as to be generally alternately switched therebetween.

In the present embodiment, as shown in (a) of FIG. 8, the step-up circuit is controlled so that current flowing in the DC reactor 15 coincides with the current target value Iin* calculated based on the above expression (7). As a result, voltages of the step-up circuit and the inverter circuit have waveforms as shown in (b) of FIG. 8, and it becomes possible to perform such an operation that high-frequency switching operations of the step-up circuit 10 and the inverter circuit 11 have respective stop periods and the switching operations are performed generally alternately.

Ideally, it is preferable that the step-up circuit 10 and the inverter circuit 11 "alternately" perform high-frequency switching so that their respective periods of high-frequency switching do not overlap each other. However, in practice, even if both periods slightly overlap each other, as long as a stop period is provided for each of the step-up circuit 10 and the inverter circuit 11, the loss can be reduced, leading to enhancement in the efficiency.

1.4 Current Phase of Outputted AC Power

The step-up circuit 10 and the inverter circuit 11 of the present embodiment output AC power having a voltage waveform approximate to the inverter output voltage target value Vinv*, to the filter circuit 21 connected at the subsequent stage, through the control by the control unit 12. The inverter device 1 outputs AC power to the commercial power system 3 via the filter circuit 21.

Here, the inverter output voltage target value Vinv* is generated by the control processing unit 30 so as to have a voltage phase leading the voltage phase of the commercial power system 3 by several degrees as described above.

Therefore, AC voltage outputted by the step-up circuit 10 and the inverter circuit 11 also has a voltage phase leading the voltage phase of the commercial power system 3 by several degrees.

As a result, the AC voltage from the step-up circuit 10 and the inverter circuit 11 is applied to one end of the AC reactor 22 (FIG. 2) of the filter circuit 21, and voltage of the commercial power system 3 is applied to the other end. Thus, voltages having phases shifted from each other by several degrees are applied to the respective ends of the AC reactor 22.

Figure 13:
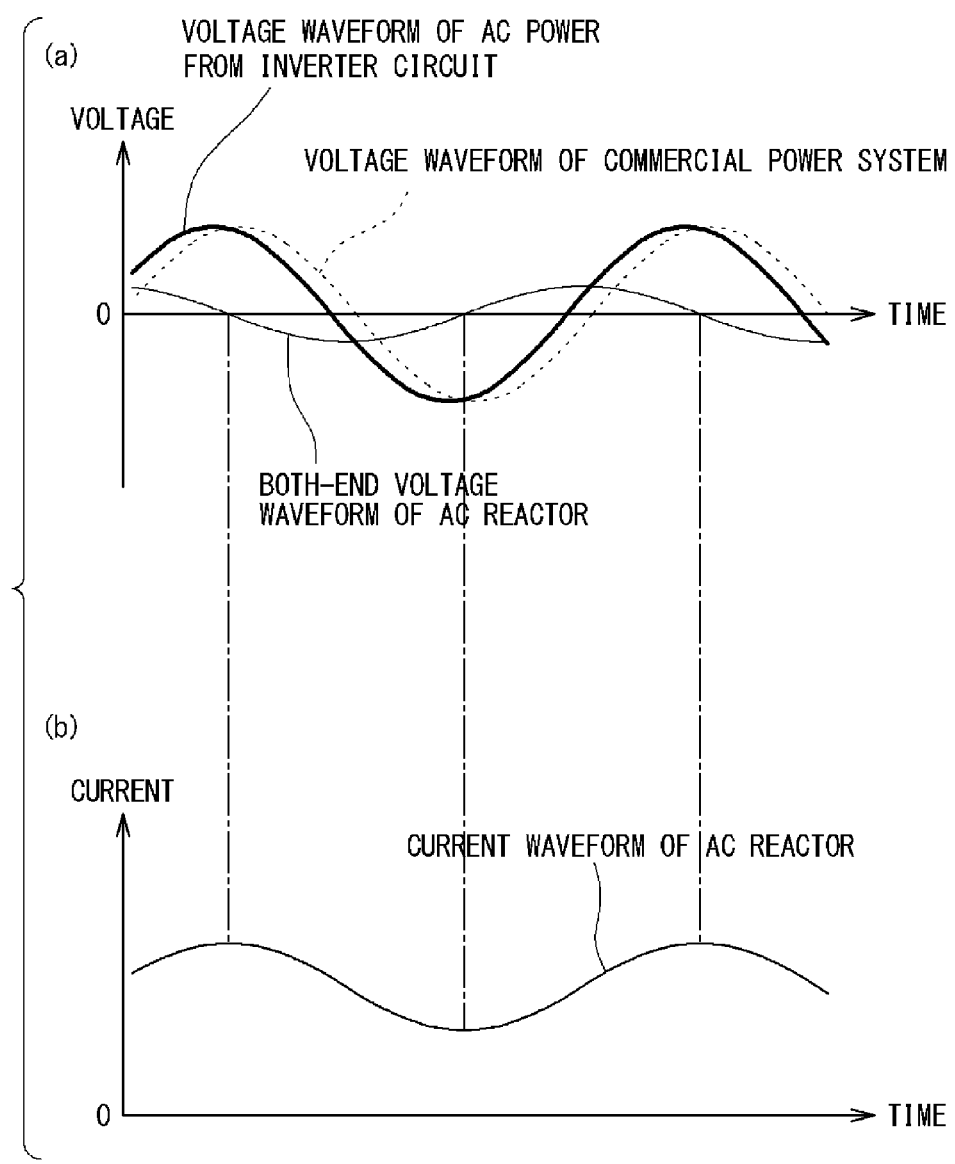
FIG. 13 is graphs in which (a) shows voltage waveforms of AC voltage outputted from the inverter circuit, a commercial power system, and voltage between both ends of an AC reactor, and (b) shows a waveform of current flowing in the AC reactor.

In FIG. 13, (a) is a graph showing voltage waveforms of AC voltage outputted from the inverter circuit 11, the commercial power system 3, and voltage between both ends of the AC reactor 22. In (a) of FIG. 13, the vertical axis indicates voltage and the horizontal axis indicates time.

As shown in (a) of FIG. 13, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 13, the phase of voltage between both ends of the AC reactor 22 leads the phase of voltage of the commercial power system 3 by 90 degrees.

In FIG. 13, (b) is a graph showing a waveform of current flowing in the AC reactor 22. In (b) of FIG. 13, the vertical axis indicates current and the horizontal axis indicates time. The horizontal axis in (b) of FIG. 13 coincides with that in (a) of FIG. 13.

The current phase of the AC reactor 22 lags the voltage phase thereof by 90 degrees. Therefore, as shown in (b) of FIG. 13, the current phase of AC power outputted through the AC reactor 22 is synchronized with the current phase of the commercial power system 3.

Therefore, although the phase of voltage outputted from the inverter circuit 11 leads the phase of the commercial power system 3 by several degrees, the phase of current outputted from the inverter circuit 11 coincides with the phase of current of the commercial power system 3.

Therefore, as shown in the lowermost graph in FIG. 12, the phase of a current waveform outputted from the inverter device 1 coincides with the voltage phase of the commercial power system 3.

As a result, AC current in phase with voltage of the commercial power system 3 can be outputted, whereby reduction in a power factor of the AC power can be suppressed.

Figure 22:
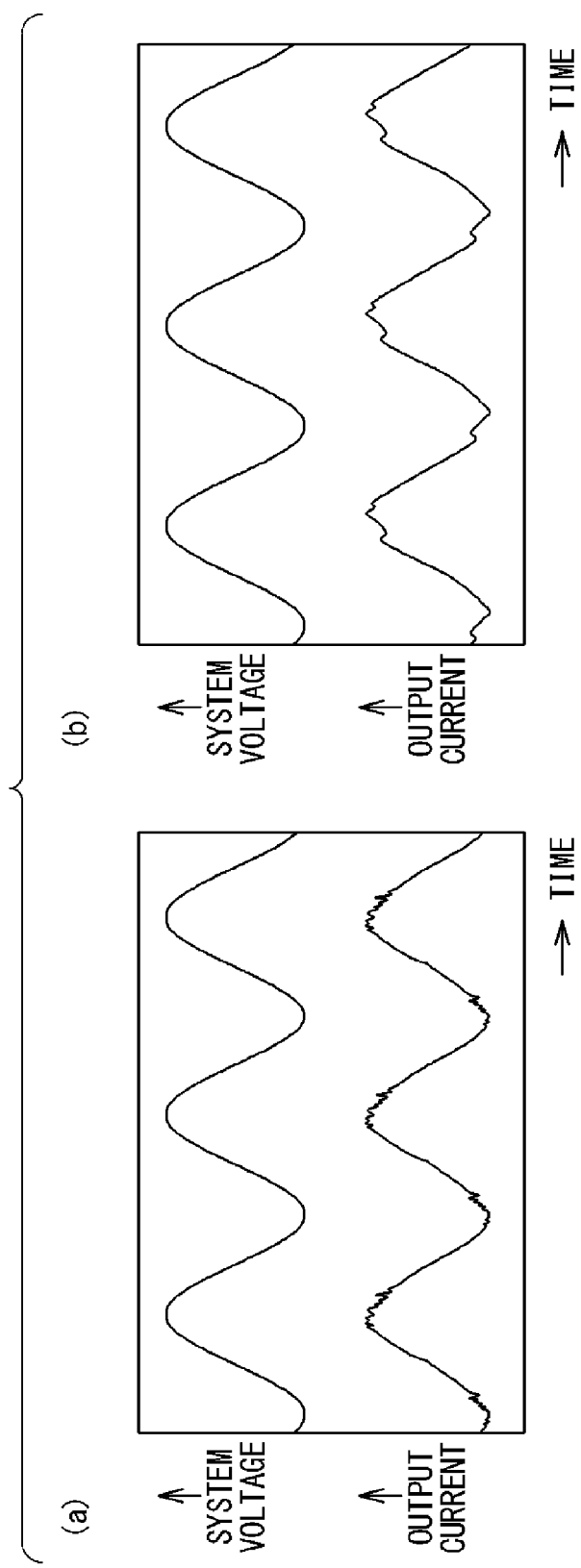
FIG. 22 is examples of AC output waveforms in the first embodiment and a comparative example.

In FIG. 22, (a) is an example of the AC output waveform of the inverter device 1 according to the above embodiment. The step-up circuit current target value Iin* in this case is given by expression (7), for example.

Thus, AC output current having a sine waveform synchronized with the system voltage is obtained. In this case, the power factor is 0.997 and an overall current distortion rate is 4.6%, and thus they are adequate for respective criterion values in system interconnection which are generally set at 0.95 or higher and at 5% or lower, respectively. Besides, a second-order distortion rate is 2.6% (adequate for 3% or lower), a third-order distortion rate is 2.9% (adequate for 3% or lower), and a fifth-order distortion rate is 0.3% (adequate for 3% or lower).

On the other hand, (b) of FIG. 22 is an example of an AC output waveform obtained when the inverter device 1 is controlled in accordance with a step-up circuit current target value prescribed by the following expression (9) described in the aforementioned Patent Literature 2.

$$Iin^* = Ia^* \times Va/Vg \qquad (9)$$

In this case, the AC output current has a waveform the peak of which is clearly distorted. The power factor is 0.947 (inadequate for 0.95 or higher) and the overall current distortion rate is 8.3% (inadequate for 5% or lower), and thus both of them are not adequate for the above criterion values in system interconnection. Besides, a second-order distortion rate is 3.5% (inadequate for 3% or lower), a third-order distortion rate is 4.3% (inadequate for 3% or lower), and a fifth-order distortion rate is 4.6% (inadequate for 3% or lower).

2. Second Embodiment

Figure 14:
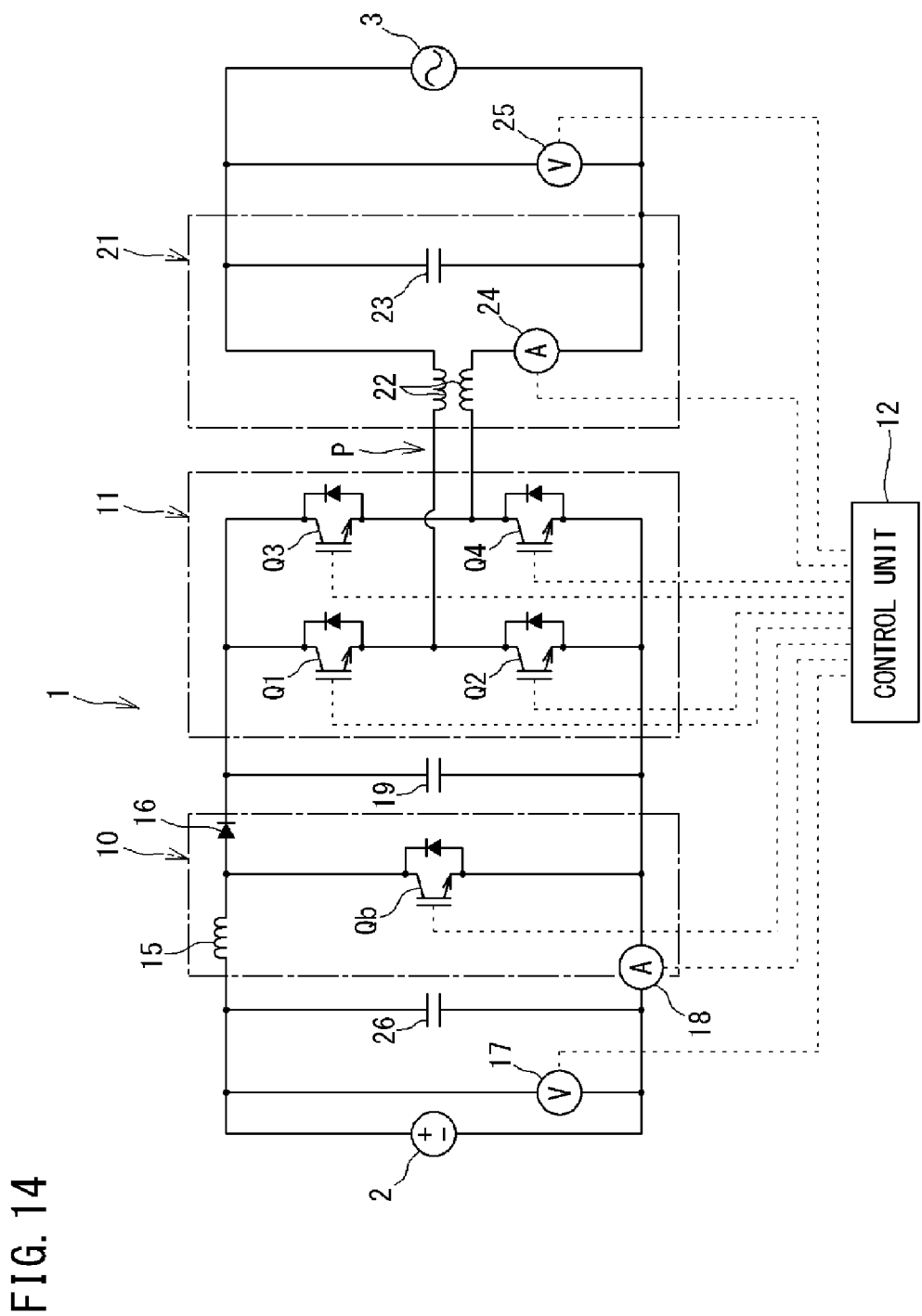
FIG. 14 is an example of a circuit diagram of an inverter device according to the second embodiment.

FIG. 14 is an example of a circuit diagram of an inverter device 1 according to the second embodiment.

A difference between the present embodiment and the first embodiment is that IGBTs are used as the switching elements Q1 to Q4 of the inverter circuit 11. The other configuration is the same as in the first embodiment.

In the present embodiment, the inverter circuit control unit 33 uses a carrier wave different from the inverter circuit carrier wave used in the above first embodiment.

Figure 15:
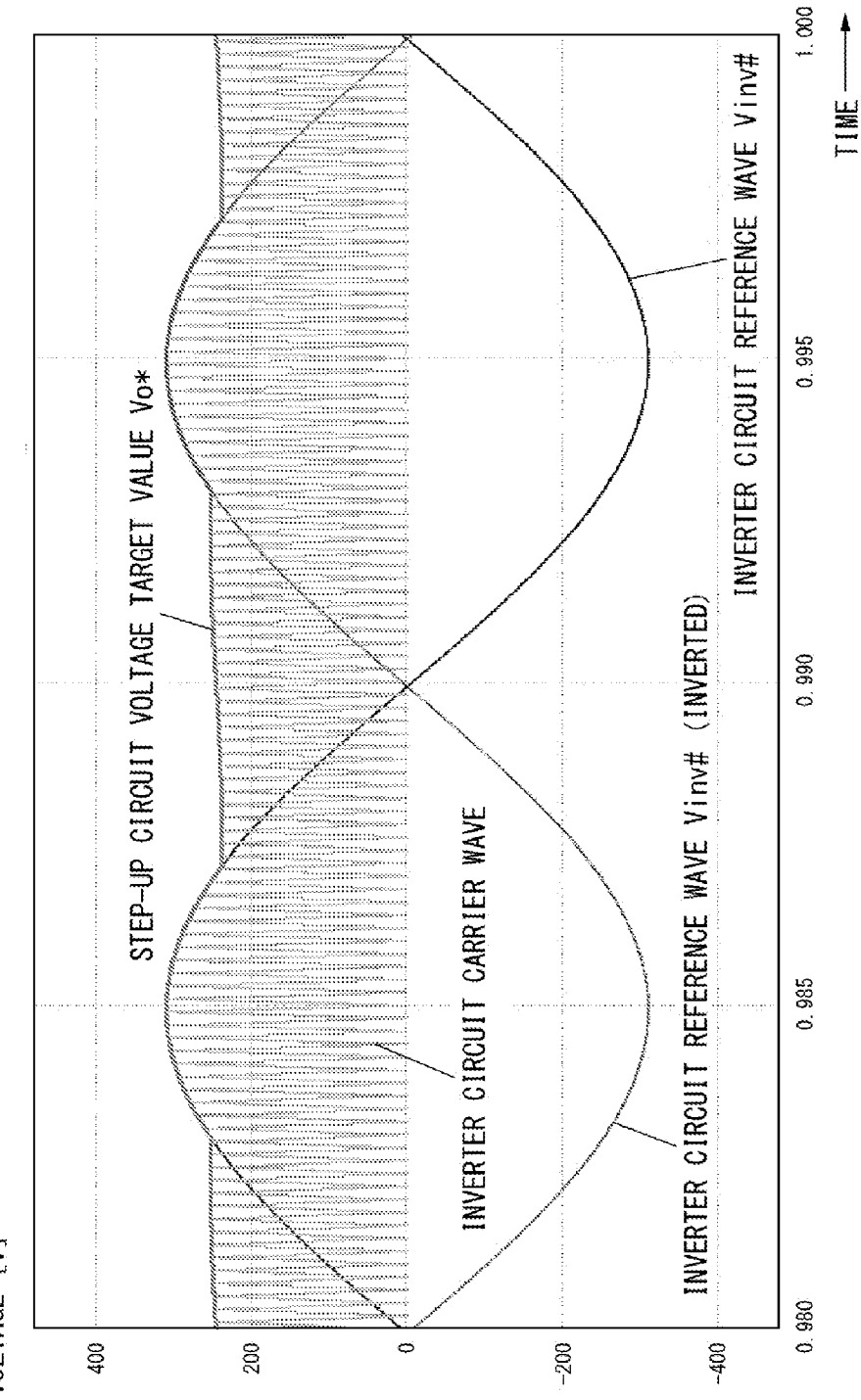
FIG. 15 is a graph showing comparison between an inverter circuit carrier wave in the second embodiment and a reference wave.

FIG. 15 is a graph showing comparison between an inverter circuit carrier wave in the second embodiment and a reference wave. In FIG. 15, the vertical axis indicates voltage and the horizontal axis indicates time.

The reference wave and a step-up circuit carrier wave are the same as those in the first embodiment.

On the other hand, the inverter circuit carrier wave of the present embodiment is a triangle wave having a lower limit value set at 0 volts and an upper limit value set at the step-up circuit voltage target value Vo*.

In this case, the inverter circuit control unit 33 generates a drive waveform for the switching element Q1 based on comparison between the inverter circuit reference wave Vinv# and the inverter circuit carrier wave, and generates a drive waveform for the switching element Q3 based on comparison between a wave inverted from the inverter circuit reference wave Vinv#, and the inverter circuit carrier wave.

Also in the present embodiment, the inverter circuit control unit 33 (step-up circuit control unit 32) compares the inverter circuit carrier wave (step-up circuit carrier wave) with the inverter circuit reference wave Vinv#, and generates drive waveforms for driving the switching elements so as to be turned on during a period in which the inverter circuit reference wave Vinv# (or a wave inverted therefrom) which is a voltage target value is equal to or greater than the inverter circuit carrier wave (step-up circuit carrier wave), and to be turned off during a period in which the inverter circuit reference wave Vinv# (or a wave inverted therefrom) is equal to or smaller than the carrier wave.

Figure 16:
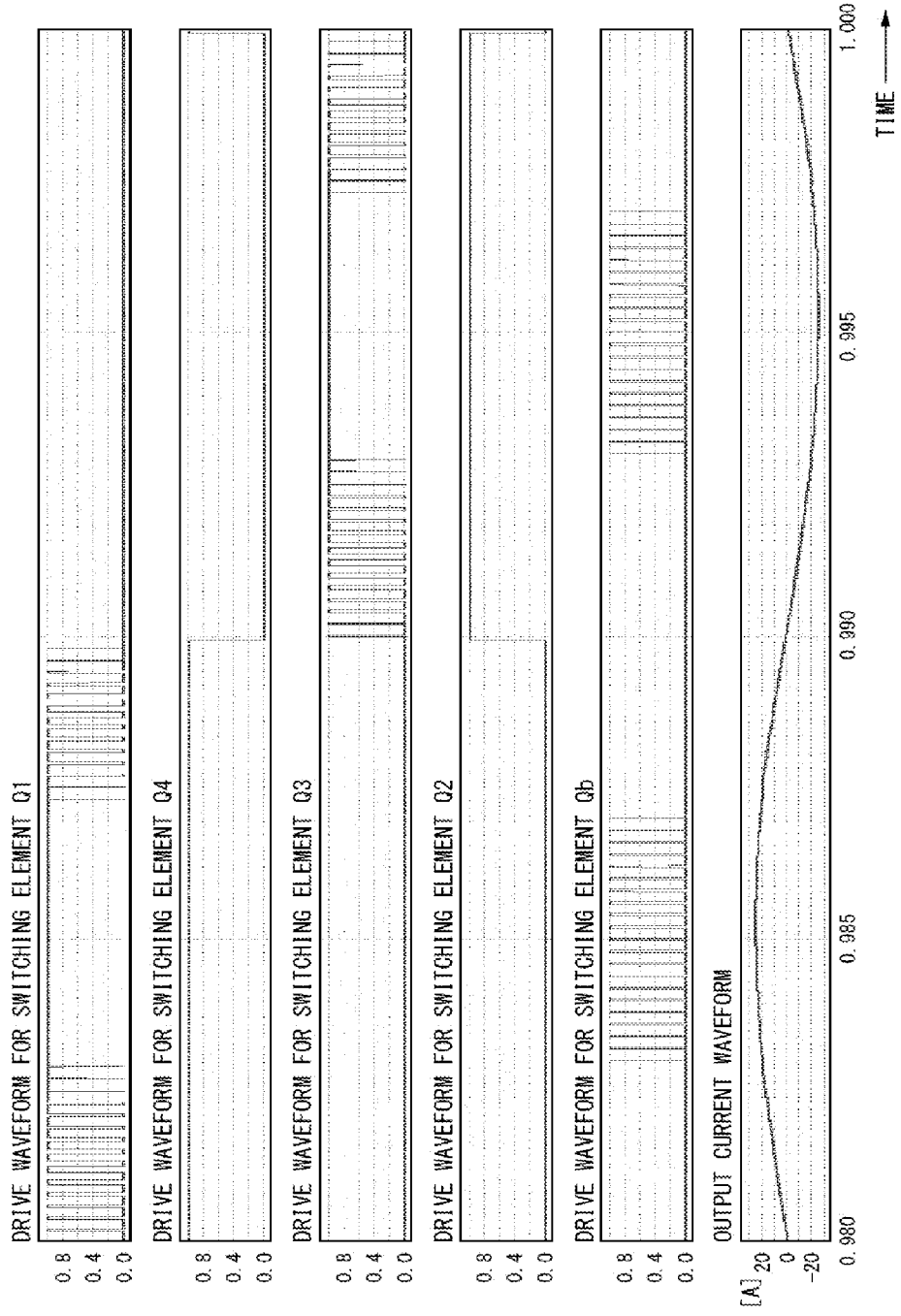
FIG. 16 is a diagram showing examples of reference waves and drive waveforms for switching elements Qb and Q1 to Q4, and an example of a current waveform of AC power outputted from the inverter device, in the second embodiment.

FIG. 16 is a diagram showing examples of the drive waveforms for the switching elements Qb and Q1 to Q4, and an example of a current waveform of AC power outputted from the inverter device 1, in the second embodiment.

FIG. 16 shows graphs of, from the uppermost side, the drive waveform for the switching element Q1, the drive waveform for the switching element Q4, the drive waveform for the switching element Q3, the drive waveform for the switching element Q2, the drive waveform for the switching element Qb, and a current waveform of AC power outputted from the inverter device 1. The horizontal axes of these graphs indicate time, and coincide with each other.

In the present embodiment, the switching element Q1 and the switching element Q3 are controlled to perform switching in a range where voltage of the inverter circuit reference wave Vinv# is between −Vg and +Vg.

Also in the present embodiment, as shown in FIG. 16, it is found that the period in which the switching element Qb of the step-up circuit 10 performs switching operation and the period in which the switching elements Q1 to Q4 of the inverter circuit 11 perform switching operations are controlled so as to be alternately switched therebetween.

The phase of a current waveform of AC power outputted from the inverter device 1 of the present embodiment coincides with the voltage phase of the commercial power system 3, as shown in FIG. 16. Therefore, as in the above first embodiment, AC power having the same current phase as the commercial power system 3 can be outputted, whereby reduction in a power factor of the AC power can be suppressed.

3. Third Embodiment

Figure 17:
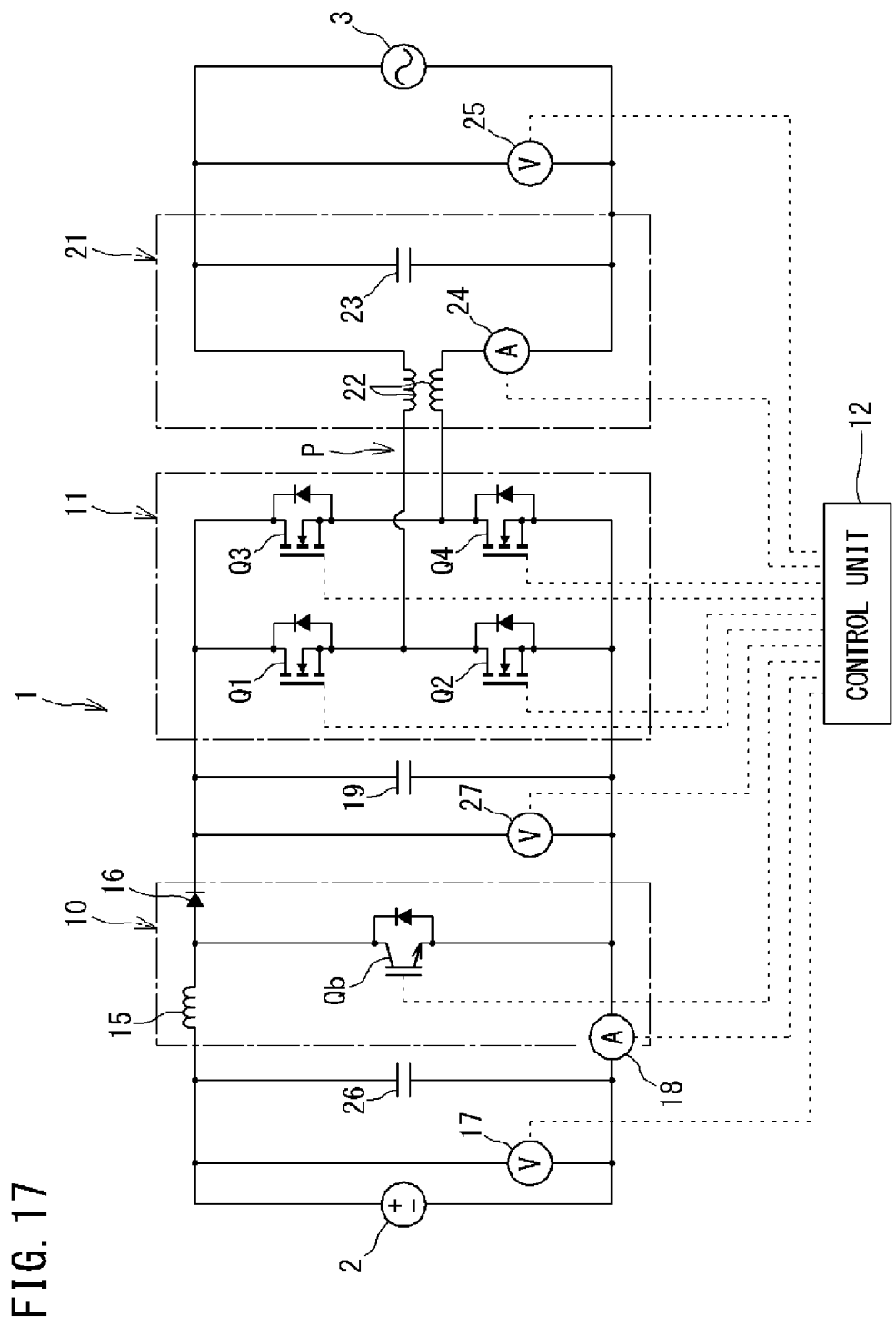
FIG. 17 is an example of a circuit diagram of an inverter device 1 according to the third embodiment.

FIG. 17 shows an example of a circuit diagram of an inverter device 1 according to the third embodiment.

A difference between the present embodiment and the first embodiment is that a third voltage sensor 27 for detecting intermediate voltage between the step-up circuit 10 and the inverter circuit 11 is provided. The other configuration is the same as in the first embodiment.

In the above first embodiment, the step-up circuit voltage target value Vo* (a target value of the intermediate voltage) is used as the amplitude of the carrier wave, but in the present embodiment, the voltage detection value Vo detected by the third voltage sensor 27 is used as the amplitude of the carrier wave.

Figure 18:
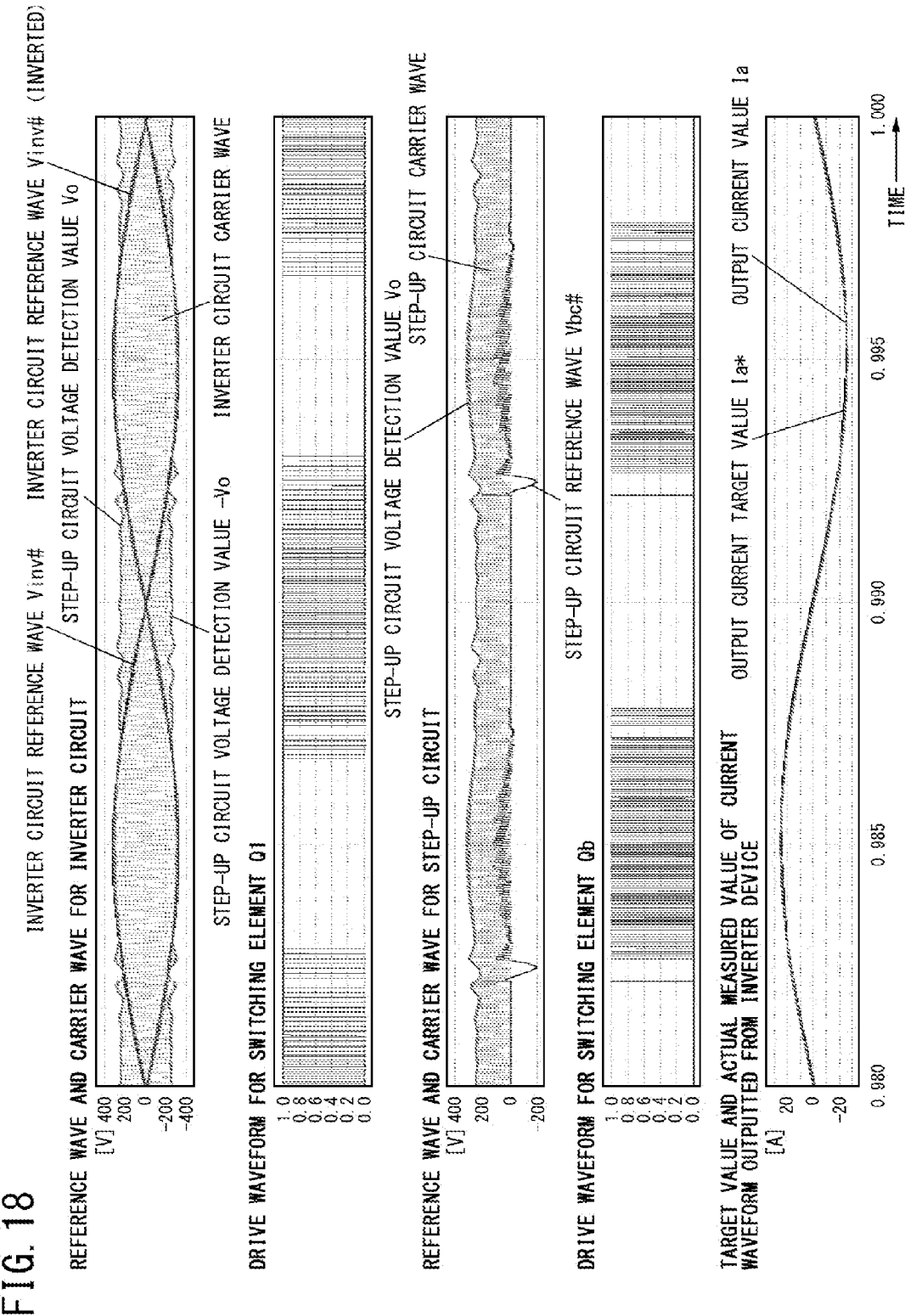
FIG. 18 is a diagram showing examples of reference waves and drive waveforms for switching elements, and an example of a current waveform of AC power outputted from the inverter device, in the third embodiment.

FIG. 18 is a diagram showing examples of the reference waves and the drive waveforms for the switching elements, and an example of a current waveform of AC power outputted from the inverter device 1, in the third embodiment.

FIG. 18 shows graphs of, from the uppermost side, the reference wave Vinv# and the carrier wave for the inverter circuit, the drive waveform for the switching element Q1, the reference wave Vbc# and the carrier wave for the step-up circuit, the drive waveform for the switching element Qb, and the target value Ia* and the actual measured value Ia of a current waveform of AC power outputted from the inverter device 1. The horizontal axes of these graphs indicate time, and coincide with each other.

As shown in FIG. 18, also in the present embodiment, it is found that output current is controlled so that the actual measured value Ia thereof coincides with the target value Ia*.

In addition, it is found that the period in which the switching element Qb of the step-up circuit 10 performs switching operation and the period in which the switching element Q1 of the inverter circuit 11 performs switching operation are controlled so as to be generally alternately switched therebetween.

As in the present embodiment, if the voltage detection value Vo is used as the amplitude of the carrier wave, response to variation in voltage of the photovoltaic panel 2 or the commercial power system 3 becomes fast, and output current of the inverter device 1 can be stabilized.

4. Supplementary Note

It has been verified that the same result as in each simulation in the above embodiments can be obtained using an actual machine.

<<AC-to-DC Conversion Device>>
[Overall Configuration]

Next, an embodiment of a conversion device 1R that performs power conversion from AC to DC will be described.

Figure 19:
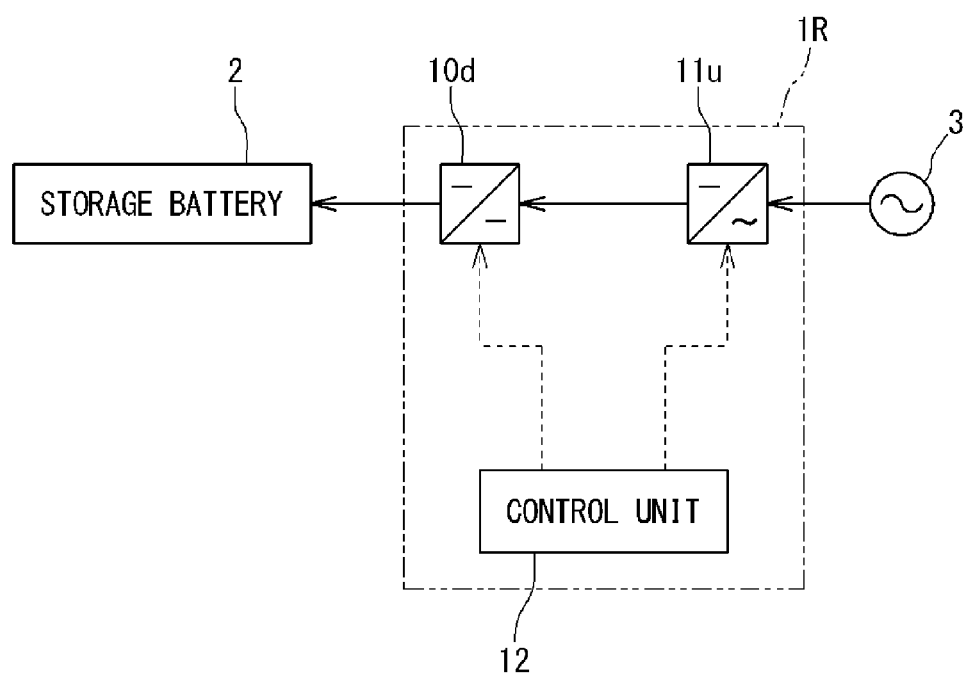
FIG. 19 is a block diagram showing an example of a power storage system including an AC-to-DC conversion device.

FIG. 19 is a block diagram showing an example of a power storage system including the conversion device 1R. In FIG. 19, a storage battery 2 is connected to an output end of the conversion device 1R, and the commercial power system 3 (AC system) is connected to an input end of the conversion device 1R. The power storage system is capable of converting power provided from the commercial power system 3, from AC to DC, and storing the converted power in the storage battery 2.

The conversion device 1R includes: an AC/DC converter 11u which converts AC power received from the commercial power system 3 to DC power; a step-down circuit (DC/DC converter) 10d which steps down output voltage of the AC/DC converter 11u; and the control unit 12 which controls operations of these circuits 10d and 11u. As is obvious from comparison with FIG. 1, the direction of energy flow is reversed.

Figure 20:
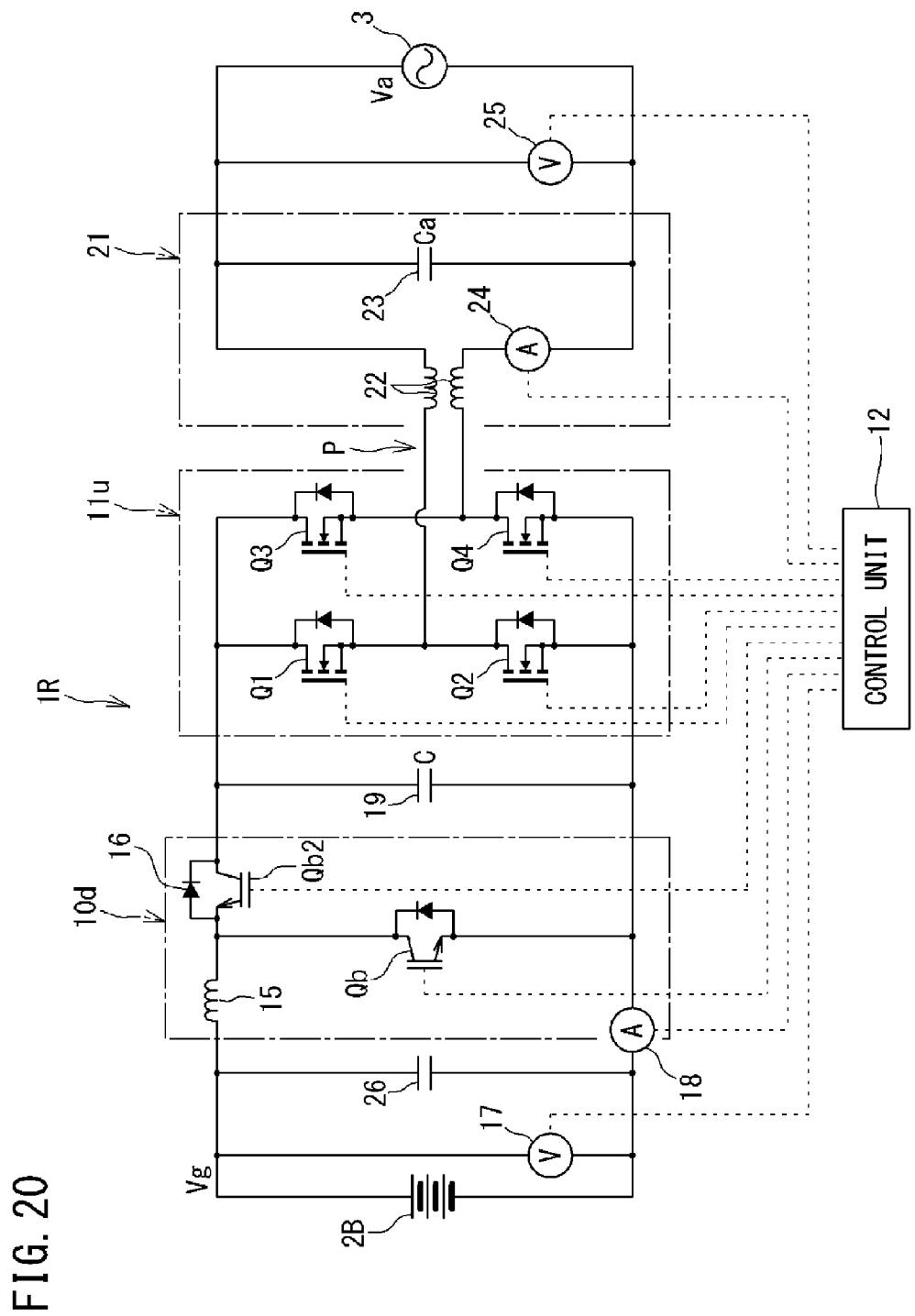
FIG. 20 is an example of a circuit diagram of the conversion device.

FIG. 20 is an example of a circuit diagram of the conversion device 1R. As a difference from FIG. 2, FIG. 14, and FIG. 17 (hereinafter, FIG. 2, etc.), first, the photovoltaic panel 2 in FIG. 2, etc. is replaced with a storage battery 2B. In addition, in the conversion device 1R, the step-up circuit 10 in FIG. 2, etc. is replaced with the step-down circuit 10d, and the inverter circuit 11 in FIG. 2, etc. is replaced with the AC/DC converter 11u which is capable of also step-up operation in cooperation with the AC reactor 22 though the components thereof are the same.

The step-down circuit 10d is provided with a switching element Qb2 in parallel with the same diode 16 as in FIG. 2, etc. As the switching element Qb2, the shown IGBT or FET can be used, for example.

The other configuration of the conversion device 1R is basically the same as that of the inverter device 1 in FIG. 2, etc. Therefore, the conversion device 1R has a bidirectional property, and is capable of performing the same operation as in the inverter device 1 in FIG. 2, etc. when a photovoltaic panel is connected. In addition, the conversion device 1R is also capable of performing autonomous operation by converting DC power of the storage battery 2B to AC power.

In the case where the conversion device 1R operates as an inverter device, the switching element Qb2 is controlled by the control unit 12 so as to be OFF constantly (in a case of IGBT) or so as to be turned on alternately with the switching element Qb (in a case of FET). In addition, the step-down circuit 10*d* serves as a step-up circuit, and the AC/DC converter 11*u* serves as an inverter circuit.

In the case of charging the storage battery 2B based on AC power of the commercial AC system 3, the control unit 12 can perform synchronous rectification by controlling operations of the switching elements Q1 to Q4. In addition, by performing PWM control under the presence of the AC reactor 22, the control unit 12 can perform rectification while performing step-up operation. Thus, the AC/DC converter 11*u* converts AC power given from the commercial AC system 3 to DC power.

The step-down circuit 10*d* forms a step-down chopper circuit. The switching elements Qb and Qb2 are controlled by the control unit 12.

The switching operation of the step-down circuit 10*d* is controlled so that a period in which the step-down circuit 10*d* performs switching operation and a period in which the AC/DC converter 11*u* performs switching operation are alternately switched. Therefore, during a period in which the step-down circuit 10*d* performs switching operation, the step-down circuit 10*d* outputs stepped-down voltage to the storage battery 2B, and during a period in which the step-down circuit 10*d* stops the switching operation (the switching element Qb is OFF and the switching element Qb2 is ON), the step-down circuit 10*d* gives DC voltage outputted from the AC/DC converter 11*u* and inputted to the step-down circuit 10*d*, to the storage battery 2 via the DC reactor 15.

[Summary of Voltage Waveform]

Figure 21:
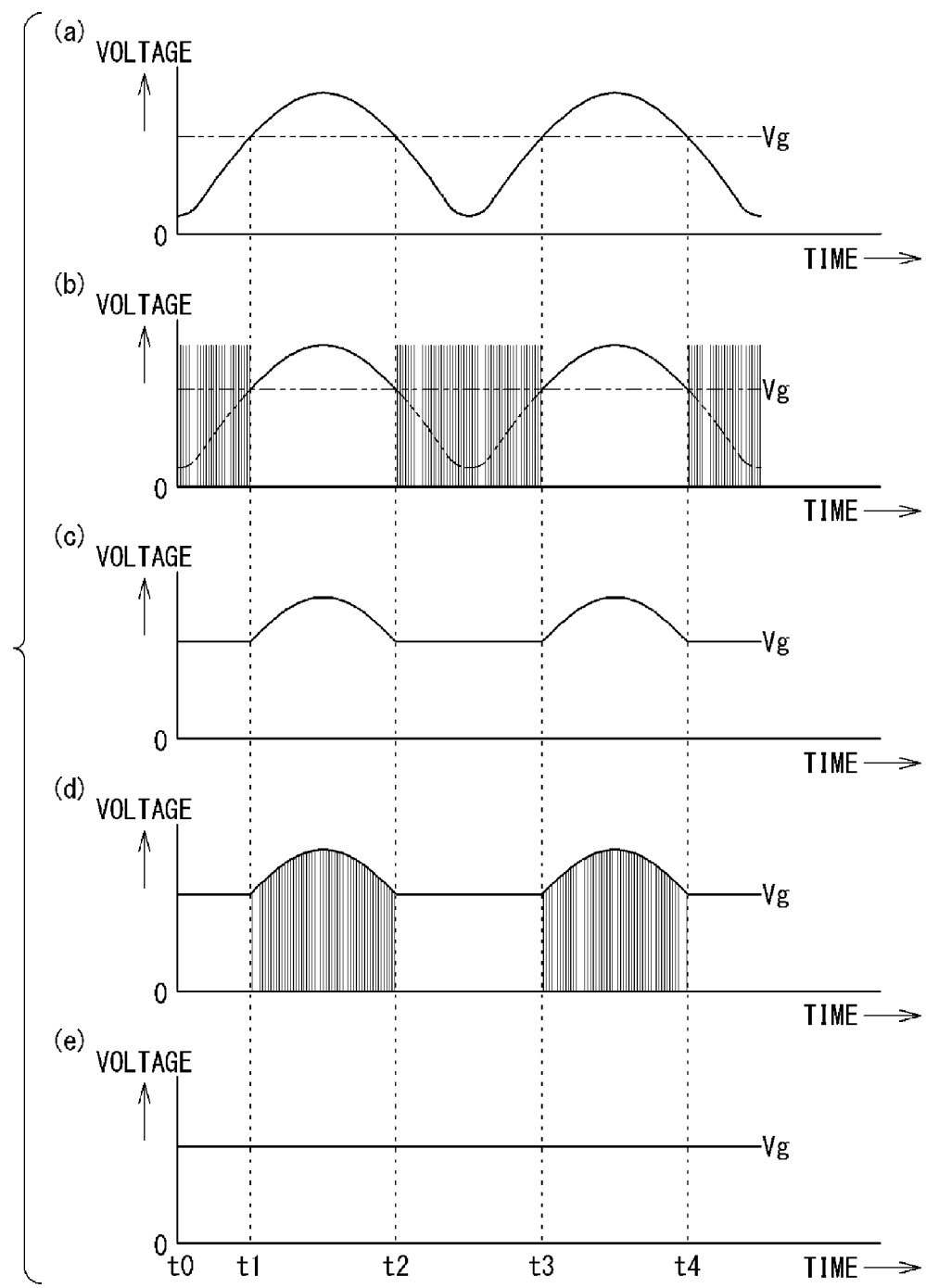
FIG. 21 is a voltage waveform diagram conceptually showing operation of the conversion device.

FIG. 21 is a voltage waveform diagram conceptually showing operation of the conversion device 1R.

In FIG. 21, (a) shows an example of an absolute value of an AC input voltage target value Vinv* for the AC/DC converter 11*u*. This generally corresponds to a full-wave-rectified waveform based on the commercial AC. A two-dot dashed line indicates DC voltage Vg for charging. As shown in (b) of FIG. 21, during periods (from t0 to t1, from t2 to t3, from t4) in which the DC voltage Vg is higher than the absolute value of the AC input voltage target value Vinv*, the AC/DC converter 11*u* performs switching operation and performs step-up operation in cooperation with the AC reactor 22.

Meanwhile, during these periods (from t0 to t1, from t2 to t3, from t4), in the step-down circuit 10*d*, the switching element Qb is OFF and the switching element Qb2 is ON, and the step-down circuit 10*d* stops step-down operation. It is noted that thin stripes shown in (b) of FIG. 21 are actually a PWM pulse train, and the duty thereof varies in accordance with the absolute value of the AC input voltage target value Vinv*. Therefore, if the voltage in this state is applied to the DC/DC converter, input voltage of the DC/DC converter, i.e., voltage of the capacitor 19 has a waveform as shown in (c) of FIG. 21.

On the other hand, during periods (from t1 to t2, from t3 to t4) in which the DC voltage Vg is lower than the absolute value of the AC input voltage target value Vinv*, the AC/DC converter 11*u* stops switching, and instead, the step-down circuit 10*d* operates. The switching mentioned here means high-frequency switching at about 20 kHz, for example, and does not mean switching at such a low frequency (twice as high as the commercial frequency) that is used for performing synchronous rectification. Even if the switching elements Q1 to Q4 are all OFF due to stop of switching in the AC/DC converter 11*u*, voltage rectified through the diodes included in the switching elements Q1 to Q4 is inputted to the step-down circuit 10*d*. Here, in order to reduce conduction loss, it is preferable to perform synchronous rectification.

In the AC/DC converter 11*u* in a case of performing synchronous rectification, through control by the control unit 12, during a period in which the sign of current in the AC/DC converter 11*u* is positive, the switching elements Q1 and Q4 are ON and the switching elements Q2 and Q3 are OFF, and during a period in which the sign of current in the AC/DC converter 11*u* is negative, ON and OFF of these switching elements are inverted. The frequency of the inversion is twice as high as the commercial frequency, and thus is very low as compared to the high-frequency switching frequency. Therefore, loss due to the ON/OFF inversion is extremely small.

Meanwhile, during the periods (from t1 to t2, from t3 to t4), the step-down circuit 10*d* performs step-down operation. Thin stripes shown in (d) of FIG. 21 are actually a PWM pulse train, and the duty thereof varies in accordance with the absolute value of the AC input voltage target value Vinv*. As a result of the step-down operation, desired DC voltage Vg shown in (e) of FIG. 21 is obtained.

As described above, only during a period in which the absolute value of the AC input voltage target value Vinv* based on AC voltage is lower than the DC voltage Vg, the AC/DC converter 11*u* operates, and during the other period, switching in the AC/DC converter 11*u* is stopped, whereby switching loss in the AC/DC converter 11*u* can be reduced.

Similarly, only during a period in which the absolute value of the AC input voltage target value Vinv* is higher than the DC voltage Vg, the step-down circuit 10*d* operates, and during the other period, switching in the step-down circuit 10*d* is stopped, whereby switching loss in the step-down circuit 10*d* can be reduced.

Thus, the AC/DC converter 11*u* and the step-down circuit 10*d* alternately perform switching operations, and when one of them operates, the other one stops switching. That is, for each of the AC/DC converter 11*u* and the step-down circuit 10*d*, a period in which switching is stopped arises. In addition, since the AC/DC converter 11*u* operates in a region other than the peak of the absolute value of the AC input voltage target value Vinv* and the vicinity thereof, voltage at which the AC/DC converter 11*u* performs switching is relatively low. This also contributes to reduction in switching loss. Thus, switching loss in the conversion device 1R as a whole can be greatly reduced.

[Specifications of Control]

Control of the conversion device 1R can be considered to be similar control obtained by reversing the direction of the control in system interconnection by the inverter device 1 in FIG. 2, etc. This control is suitable for, with use of the conversion device 1R which can perform the same system interconnection as in the inverter device 1, enhancing the efficiency of the conversion device 1R also in the reversed operation.

Various values in the inverter device 1, and various values in the conversion device 1R corresponding thereto are as follows.

Ia*: a target value for input current from the commercial power system 3
Iin: a step-down circuit current detection value
Iin*: a step-down circuit current target value
Iinv*: a target value for AC input current to the AC/DC converter 11u
Ig*: a target value for DC input current to the storage battery 2B
Ic: current flowing through the capacitor 19
Ica: current flowing through the capacitor 23
Va: a system voltage detection value
Vg: a storage battery voltage value
Vinv*: a target value for AC input voltage to the AC/DC converter 11u
Vo*: a target value for input voltage to the step-down circuit 10d
Pin: input power to the storage battery 2B
$P_{Loss}$: power loss in the conversion device 1R
η: a power conversion efficiency in the conversion device 1R Therefore, it is possible to apply the following relationships corresponding to the aforementioned expressions (1) to (8) for the inverter device 1 in FIG. 2, etc.

An average value <Pin> of input power Pin to the storage battery 2B, corresponding to expression (1), is represented as follows.

$$<Pin>=<Iin \times Vg> \quad (R1)$$

An average value <Ia*> of the target value for input current from the commercial power system 3, corresponding to expression (2), is represented as follows.

$$<Ia^*>=<Ig^* \times Vg>/(\eta \times <Va>) \quad (R2)$$

The input current target value Ia* corresponding to expression (3) is represented as follows.

$$Ia^*=(\sqrt{2}) \times <Ia^*> \times \sin \omega t \quad (R3)$$

The AC input current target value Iinv* corresponding to expression (4) is represented as follows.

$$Iinv^*=Ia^*-sCaVa \quad (R4)$$

The above expression (R4) is represented as follows, using a derivative with respect to time t.

$$Iinv^*=Ia^*-Ca \times (dVa/dt) \quad (R4a)$$

If current flowing through the capacitor 23 is detected and the detected current is denoted by Ica, the following expression is obtained.

$$Iinv^*=Ia^*-Ica \quad (R4b)$$

The AC input voltage target value Vinv* corresponding to expression (5) is represented as follows.

$$Vinv^*=Va-Za\,Iinv^* \quad (R5)$$

The above expression (R5) is represented as follows, using a derivative with respect to time t.

$$Vinv^*=Va-\{RaIinv^*+La \times (dIinv^*/dt)\} \quad (R5a)$$

As described above, the input target values (Iinv*, Vinv*) for the AC/DC converter 11u which are AC-side target values are set at a circuit connection point P between the AC/DC converter 11u and the filter circuit 21. Therefore, as in a case of performing system interconnection, a point where the target values are set is moved to a stage (AC/DC converter 11u side) preceding to a circuit connection point between the commercial power system 3 and the conversion device 1R. By such, as it were, "reverse" system interconnection, appropriate interconnection between AC and DC is performed.

As for the input voltage target value Vo* for the step-down circuit 10d corresponding to expression (6), Vgf, i.e., (Vg−Z Iin) in expression (6) is replaced with Vgr, i.e., (Vg+Z Iin), to obtain the following expression.

$$Vo^*=\text{Max}(Vg+ZIin,\text{absolute value of }Vinv^*) \quad (R6)$$

The above expression (R6) is represented as follows, using a derivative with respect to time t.

$$Vo^*=\text{Max}(Vg+RIin+L(dIin/dt),\text{absolute value of }Vinv^*) \quad (R6a)$$

The step-down circuit current target value Iin* is represented as follows.

$$Iin^*=\{(Iinv^* \times Vinv^*)-(sCVo^*) \times Vo^*\}/(Vg+ZIin) \quad (R7)$$

The above expression (R7) is represented as follows, using a derivative with respect to time t.

$$Iin^*=\{(Iinv^* \times Vinv^*)-C \times (dVo^*/dt) \times Vo^*\}/\{Vg+RIin+L(dIin/dt)\} \quad (R7a)$$

If current flowing through the capacitor 19 is detected and the detected current is denoted by Ic, the following expression is obtained.

$$Iin^*=\{(Iinv^* \times Vinv^*)-Ic \times Vo^*\}/(Vg+ZIin) \quad (R7b)$$

In expressions (R7), (R7a), and (R7b), a term added to a product of the AC input current target value Iinv* and the AC input voltage target value Vinv* is a value added in consideration of reactive power passing through the capacitor 19. That is, consideration of the reactive power in addition to the power target value for the AC/DC converter 11u allows for more accurate calculation of the value of Iin*.

Further, if power loss $P_{LOSS}$ of the conversion device 1R is measured in advance, the above expression (R7a) can be represented as follows.

$$Iin^*=\{(Iinv^* \times Vinv^*)-C \times (dVo^*/dt) \times Vo^*-P_{LOSS}\}/(Vg+ZIin) \quad (R7c)$$

Similarly, the above expression (R7b) can be represented as follows.

$$Iin^*=\{(Iinv^* \times Vinv^*)-Ic \times Vo^*-P_{LOSS}\}/(Vg+ZIin) \quad (R7d)$$

In this case, consideration of the reactive power and the power loss $P_{LOSS}$ in addition to the power target value of the AC/DC converter 11u allows for more strict calculation of the value of Iin*.

If the electrostatic capacitance C and the power loss $P_{LOSS}$ of the capacitor 19 are sufficiently smaller than (Iinv* × Vinv*), the following expression (R8) is obtained. Iin* calculated by this expression (R8) can be used as Iin contained in the right-hand sides of expressions (R6), (R6a), (R7), (R7a), (R7b), (R7c), and (R7d).

$$Iin^*=(Iinv^* \times Vinv^*)/Vg \quad (R8)$$

As described above, the control unit 12 performs control so that the step-down circuit 10d is operated in a case of outputting voltage corresponding to the part where the absolute value of the AC input voltage target value Vinv* for the AC/DC converter 11u is higher than the DC voltage (Vg+Z Iin), and the AC/DC converter 11u is operated in a case of outputting voltage corresponding to the part where the absolute value of the AC input voltage target value Vinv* for the AC/DC converter 11u is lower than the DC voltage (Vg+Z Iin). Therefore, a potential difference in power stepped up by the AC/DC converter flu can be reduced, and loss due to switching of the AC/DC converter 11u and the step-down circuit 10d is reduced, whereby DC power can be outputted with increased efficiency.

Further, since both the step-down circuit 10d and the AC/DC converter 11u operate based on the target values set by the control unit 12, occurrence of phase-deviation or distortion in AC current inputted to the AC/DC converter 11u can be suppressed even if operation is performed so as to alternately switch the high-frequency switching period between the two circuits.

In addition, as described above, the conversion device 1R can perform the same system interconnection operation as in the inverter device 1 in FIG. 2, etc. Therefore, it is possible to realize an efficient conversion device that can be used in both directions of DC/AC conversion to perform system interconnection, and AC/DC conversion.

[Others]

In FIG. 20, an example in which FETs are used as the switching elements composing the AC/DC converter 11u has been shown. However, instead of FETs, IGBTs may be used as shown in FIG. 14. In the case of IGBTs, synchronous rectification cannot be performed. Therefore, when high-frequency switching of the AC/DC converter 11u is stopped, the AC/DC converter 11u operates as a full-bridge rectification circuit by means of the diodes included in the elements.

<<Supplement>>

It is desirable that, in the circuit configurations in FIG. 2, FIG. 14, and FIG. 20, SiC elements are used for at least one of the semiconductor switching elements included in the DC/DC converter 10, and the semiconductor switching elements included in the DC/AC inverter 11 (or AC/DC converter 11u).

In the above conversion device 1, switching loss in the semiconductor elements and iron loss in the DC reactor 15 and the AC reactor 22 can be reduced by decrease in the number of times of high-frequency switching, but conduction loss in the semiconductor elements cannot be reduced. In this regard, using SiC elements as the semiconductor elements enables reduction in the conduction loss. Therefore, if SiC elements are used for the conversion device 1 controlled as described above, a high conversion efficiency can be achieved by the synergistic effect therebetween.

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 inverter device
1R conversion device
2 photovoltaic panel
2B storage battery
3 commercial power system
10 step-up circuit (DC/DC converter)
10d step-down circuit (DC/DC converter)
11 inverter circuit (DC/AC inverter)
11u AC/DC converter
12 control unit
15 DC reactor
16 diode
17 first voltage sensor
18 first current sensor
19 capacitor (smoothing capacitor (second capacitor))
21 filter circuit
22 AC reactor
23 capacitor (output smoothing capacitor (first capacitor))
24 second current sensor
25 second voltage sensor
26 capacitor
27 third voltage sensor
30 control processing unit
32 step-up circuit control unit
33 inverter circuit control unit
34 averaging processing unit
41 first calculation section
42 first adder
43 compensator
44 second adder
51 second calculation section
52 third adder
53 compensator
54 fourth adder
P circuit connection point
Q1 to Q4, Qb switching element

The invention claimed is:

1. A high-frequency switching type conversion device that converts DC power provided from a DC power supply, to AC power and supplies the AC power to a load, the conversion device comprising:
a filter circuit connected to the load and including an AC reactor and a first capacitor;
a DC/AC inverter connected to the load via the filter circuit;
a DC/DC converter provided between the DC power supply and the DC/AC inverter;
a second capacitor provided between the DC/AC inverter and the DC/DC converter; and
a control unit configured to control the DC/DC converter and the DC/AC inverter to alternately have a stop period of high-frequency switching, the control unit being configured to set a current target value for the DC/DC converter to thereby be synchronized with current of the AC power, based on voltage of the AC power, voltage variation due to current flowing through the AC reactor and an impedance of the AC reactor, reactive currents respectively flowing through the first capacitor and the second capacitor, and voltage of the DC power,
wherein, in a case where an output current target value for the load is Ia*, an electrostatic capacitance of the first capacitor is Ca, a voltage value of the AC power is Va, voltage on the DC power supply side is $V_{DC}$, and a Laplace operator is s, the control unit sets an AC output current target value Iinv* for the DC/AC inverter at a circuit connection point between the filter circuit and the DC/AC inverter.

2. The conversion device according to claim 1, wherein in a case where an output current target value for the load is Ia*, an electrostatic capacitance of the first capacitor is Ca, a voltage value of the AC power is Va, voltage on the DC power supply side is VDC, and an Laplace operator is s, the control unit sets an AC output current target value Iinv* for the DC/AC inverter at a circuit connection point between the filter circuit and the DC/AC inverter, as follows "this should be" in the case where the output current target value for the load is Ia*, the electrostatic capacitance of the first capacitor is Ca, the voltage value of the AC power is Va, voltage on the DC power supply side is $V_{DC}$, and the Laplace operator is s, the control unit sets the AC output current target value Iinv* for the DC/AC inverter at the circuit connection point between the filter circuit and the DC/AC inverter, as follows $$Iinv^* = Ia^* + sCaVa,$$

in a case where an impedance of the AC reactor is Za, the control unit sets an AC output voltage target value Vinv* for the DC/AC inverter at the circuit connection point, as follows:

$$Vinv^* = Va + ZaIinv^*,$$

the control unit sets the greater one of the voltage $V_{DC}$ and an absolute value of the AC output voltage target value Vinv* for the DC/AC inverter, as an output voltage target value Vo* for the DC/DC converter, and in a case where an electrostatic capacitance of the second capacitor is C, the control unit sets a current target value Iin* for the DC/DC converter, as follows:

$$Iin^* = \{(Iinv^* \times Vinv^*) + (sCVo^*) \times Vo^*\}/V_{DC}.$$

3. The conversion device according to claim 2, wherein the DC/DC converter includes a DC reactor, and in a case where voltage of the DC power supply is Vg, an impedance of the DC reactor is Z, and a current value of the DC/DC converter is Iin, (Vg−ZIin) is used as the voltage $V_{DC}$.

4. The conversion device according to claim 3, wherein the current value Iin of the DC/DC converter is set to a detection value of a current sensor or a calculation value obtained by Iinv*×Vinv*/Vg.

5. The conversion device according to claim 1, wherein the DC/AC inverter is controlled based on comparison between a reference value based on a target value and a detection value of AC output current of the DC/AC inverter, and an output voltage target value for the DC/DC converter, and the DC/DC converter is controlled based on comparison between a reference value based on a current target value and a detection value of the DC/DC converter, and the output voltage target value for the DC/DC converter.

6. The conversion device according to claim 1, wherein the load is a commercial power system.

7. The conversion device according to claim 1, wherein the DC power supply is a DC load, and the load is an AC power supply, and power is supplied from the AC power supply to the DC load.

8. The conversion device according to claim 1, wherein a SiC element is used for at least one of semiconductor switching elements included in the DC/DC converter and the DC/AC inverter.

9. The conversion device according to claim 2, wherein the DC/AC inverter is controlled based on comparison between a reference value based on a target value and a detection value of AC output current of the DC/AC inverter, and an output voltage target value for the DC/DC converter, and the DC/DC converter is controlled based on comparison between a reference value based on a current target value and a detection value of the DC/DC converter, and the output voltage target value for the DC/DC converter.

10. The conversion device according to claim 3, wherein the DC/AC inverter is controlled based on comparison between a reference value based on a target value and a detection value of AC output current of the DC/AC inverter, and an output voltage target value for the DC/DC converter, and the DC/DC converter is controlled based on comparison between a reference value based on a current target value and a detection value of the DC/DC converter, and the output voltage target value for the DC/DC converter.

11. The conversion device according to claim 4, wherein the DC/AC inverter is controlled based on comparison between a reference value based on a target value and a detection value of AC output current of the DC/AC inverter, and an output voltage target value for the DC/DC converter, and the DC/DC converter is controlled based on comparison between a reference value based on a current target value and a detection value of the DC/DC converter, and the output voltage target value for the DC/DC converter.

* * * * *

UNITED STATES PATENT AND TRADEMARK OFFICE
CERTIFICATE OF CORRECTION

PATENT NO. : 9,882,508 B2  
APPLICATION NO. : 15/032197  
DATED : January 30, 2018  
INVENTOR(S) : Ayai et al.

Page 1 of 1

It is certified that error appears in the above-identified patent and that said Letters Patent is hereby corrected as shown below:

Claim 2, Column 30, Lines 56-62, "a case where an output current target value for the load is Ia*, an electrostatic capacitance of the first capacitor is Ca, a voltage value of the AC power is Va, voltage on the DC power supply side is $V_{DC}$, and an Laplace operator is s, the control unit sets an AC output current target value Iinv* for the DC/AC inverter at a circuit connection point between the filter circuit and the DC/AC inverter, as follows "this should" should be deleted Claim 2, Column 30, Line 63, "be" in" should be deleted Signed and Sealed this  
Tenth Day of July, 2018

Andrei Iancu  
*Director of the United States Patent and Trademark Office*